(12) United States Patent
Kim et al.

(10) Patent No.: US 8,019,389 B2
(45) Date of Patent: Sep. 13, 2011

(54) METHOD OF CONTROLLING MOBILE COMMUNICATION DEVICE EQUIPPED WITH TOUCH SCREEN, COMMUNICATION DEVICE AND METHOD OF EXECUTING FUNCTIONS THEREOF

(75) Inventors: Jong-Hwan Kim, Seoul (KR); Sang Hyuck Lee, Seoul (KR); Mu Hy Yoon, Seoul (KR); Hee Soo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 767 days.

(21) Appl. No.: 12/058,655

(22) Filed: Mar. 28, 2008

(65) Prior Publication Data

US 2008/0259045 A1    Oct. 23, 2008

(30) Foreign Application Priority Data

Mar. 30, 2007  (KR) .......................... 10-2007-0031375
Oct. 17, 2007  (KR) .......................... 10-2007-0104437

(51) Int. Cl.
*H04M 1/00*  (2006.01)
*G06F 3/041*  (2006.01)

(52) U.S. Cl. ........................................ 455/566; 345/173
(58) Field of Classification Search .................. 455/566; 345/846

See application file for complete search history.

(56) References Cited

U.S. PATENT DOCUMENTS 7,620,174 B1 *  11/2009  Bick .......................... 379/433.01
2003/0206202 A1 *  11/2003  Moriya .......................... 345/846
2005/0138630 A1    6/2005  Reynolds

FOREIGN PATENT DOCUMENTS

EP  1739533  1/2007
WO  WO 98/48554  10/1998

* cited by examiner

*Primary Examiner* — Marisol Figueroa
(74) *Attorney, Agent, or Firm* — Lee, Hong, Degerman, Kang & Waimey

(57) ABSTRACT

A method of controlling a mobile communication device equipped with a touch screen, and a communication device and a method of executing functions thereof are disclosed. A method of controlling a mobile communication device includes displaying a plurality of execution keys on a touch screen in a standby mode and executing an operation assigned to a specific one of the plurality of execution keys by touching and dragging the specific execution key.

27 Claims, 35 Drawing Sheets

FIG. 14A

| | (a) | | | (b) | |
|---|---|---|---|---|---|
| Designate function area | | | Designate function area | | |
| 1. Call ☑ | | | 1. Call ☑ | | |
| 2. Message ☑ | | | 2. Message — Write ☑ ☐ | | |
| 3. E-mail ☑ | | | 3. E-mail — In box ☐ ☐ | | |
| 4. IM ☐ | | | — Out box ☐ ☐ | | |
| 5. Navigation ☐ | | | 4. IM — Multi-media ☐ ☐ | | |
| 6. Access homepage ☑ | | | 5. Navigation ☐ | | |
| | | | 6. Access homepage ☐ | | |
| Menu | OK | Previous | Menu | OK | Previous |

FIG. 14B (a) Designate identification information:
1. Kim Ki-yeong ☑
2. Kim Chol-soo ☐
3. Kim Yeong-soo ☑
4. Lee Yeong-ah ☑
5. Choi Min-soo ☐
6. Choi Min-cheol ☑

(b) Designate identification information:
1. Telephone number ☑
2. E-mail address ☑
3. Messenger ID ☑
4. Homepage address ☐
5. Image ☑

| | 723 |
|---|---|
| Call | Mother ☏ |
| SMS | Brother ☏ (IM) |
| MMS | 011-111-1111 |
| E-mail | 031-456-4567 |
| IM | 114 |
| Homepage | ⋮ |
| Navigation | |
| ⋮ | |
| Menu | OK | Next |

| | 724 |
|---|---|
| Call | Home ☏ 100 |
| SMS | Mother ☏ 57 |
| MMS | Brother ☏ 40 |
| E-mail | 011-111-1111 10 |
| IM | 114 5 |
| Homepage | ⋮ |
| Navigation | |
| ⋮ | |
| Menu | OK | Next |

METHOD OF CONTROLLING MOBILE COMMUNICATION DEVICE EQUIPPED WITH TOUCH SCREEN, COMMUNICATION DEVICE AND METHOD OF EXECUTING FUNCTIONS THEREOF

CROSS REFERENCE TO RELATED APPLICATIONS

This application claims priority under 35 U.S.C. §119(a) to Patent Application No. 10-2007-0031375 filed in Republic of Korea on Mar. 30, 2007, the entire contents of which are hereby incorporated by reference.

This application also claims priority under 35 U.S.C. §119 (a) to Patent Application No. 10-2007-0104437 filed in Republic of Korea on Oct. 17, 2007, the entire contents of which are hereby incorporated by reference.

BACKGROUND

1. Field

This document relates to a method of controlling a mobile communication device equipped with a touch screen, and a communication device and a method of executing functions thereof.

2. Related Art

In general, communication devices refer to devices equipped with one or more of audio/video communication function, information input/output functions, a data storage function and the like.

In recent years, a communication device has become adapted to be able to perform a variety of functions, such as image capturing of still images, motion images, etc., the play of multimedia files such as music files or motion image files, game, reception/output of broadcasting, and road guide services, in addition to the above functions and, therefore, has been implemented as a complex multimedia player.

In order to implement complicated functions, a variety of new attempts have been made to this multimedia player from a hardware or software point of view. For example, in order for users to search or select functions easily and conveniently, a user interface (UI) environment implemented in various ways has been provided. There is also an increasing interest in a touch screen, that is, a device adapted to receive information in a touch manner and display received information.

According to the prior art, a communication device can perform various operations associated with a counterpart device, such as transmission of a call/message to a counterpart.

However, this makes a user troublesome because he must input every telephone number of a counterpart's device that will receive his call/message. Further, a user must perform several times of key operations in order to select a specific one of various operations associated with a counterpart device.

SUMMARY

BRIEF DESCRIPTION OF THE DRAWINGS

The implementation of this document will be described in detail with reference to the following drawings in which like numerals refer to like elements.

FIGS. 14A to 14C show screen configurations of a process of designating function areas and/or identification information in the communication device related to an embodiment of this document;

FIGS. 15A to 15C show first screen configurations displaying a function area and identification information in the communication device related to an embodiment of this document;

FIGS. 17A to 17F show third screen configurations displaying a function area and identification information in the communication device related to an embodiment of this document;

DETAILED DESCRIPTION

The above objects, characteristics and merits of this document will become more apparent from the following detailed description taken in conjunction with the accompanying drawings. The present invention will now be described in detail in connection with specific embodiments with reference to the accompanying drawings. The same reference numbers will be used throughout the drawings to refer to the same or like parts. Further, detailed description on the known functions and constructions will be omitted if they are determined to make the gist of this document unnecessarily vague.

A communication device may comprise a mobile phone, a smart phone, a notebook computer, a communication device for digital broadcasting, personal digital assistants (PDA), a portable multimedia player (PMP), a navigation device, a digital camera, a MP3 player, and the like.

Figure 1:
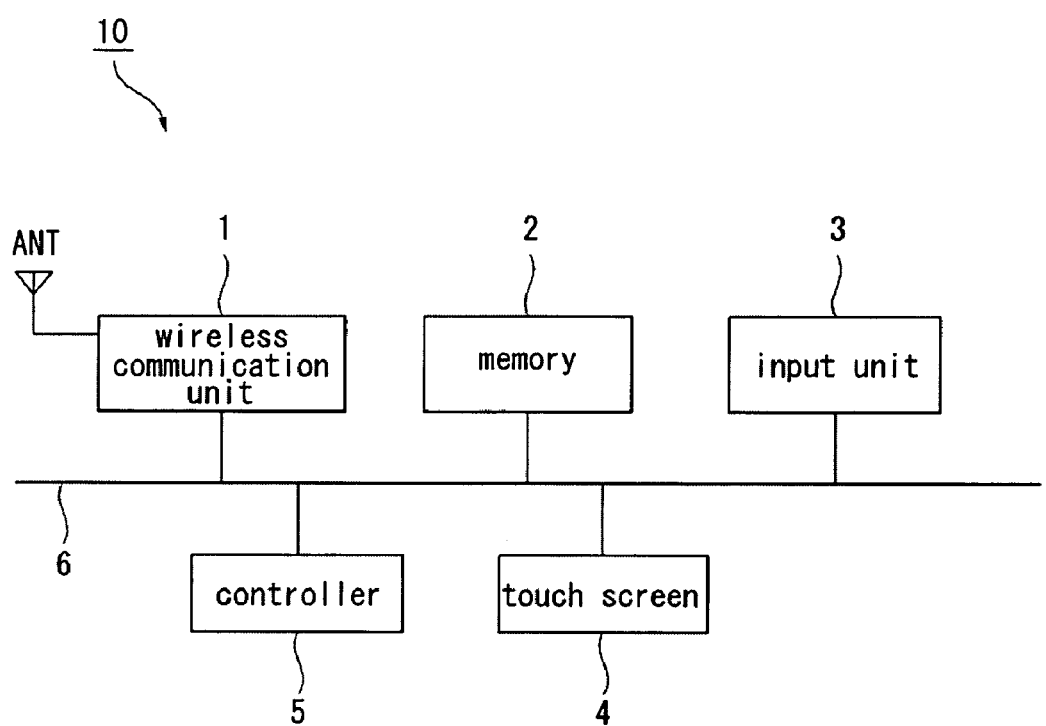
FIG. 1 is a block diagram showing a construction of a mobile communication device in accordance with an embodiment of this document.

FIG. 1 is a block diagram showing a construction of a mobile communication device in accordance with an embodiment of this document.

Referring to FIG. 1, a mobile communication device 10 of this document may comprise a wireless communication unit 1, a memory 2, an input unit 3, a touch screen 4, and a controller 5. The respective constituent elements may be interconnected through a bus 6.

The wireless communication unit 1 performs a communication function of the mobile communication device 10 by transmitting/receiving radio signals to/from a base station (not shown).

The memory 2 comprises program memory and data memories. In the program memory are stored programs for controlling general operations of the mobile communication device 10. In an embodiment of this document, the memory 2 stores short-cut information corresponding to execution keys, such as short-cut menus, short-cut telephone numbers, short-cut folders, and short-cut URLs.

The input unit 3 transfers a request of a user to the controller 5. In an embodiment of this document, the input unit 3 comprises the touch screen 4 and various keys (for example, a side key).

The touch screen 4 is adapted to receive information in a touch manner or display received information. The touch screen 4 is also adapted to display menu screens in accordance with an embodiment of this document.

The controller 5 controls an overall operation of the mobile communication device 10 of this document.

Figure 2A:
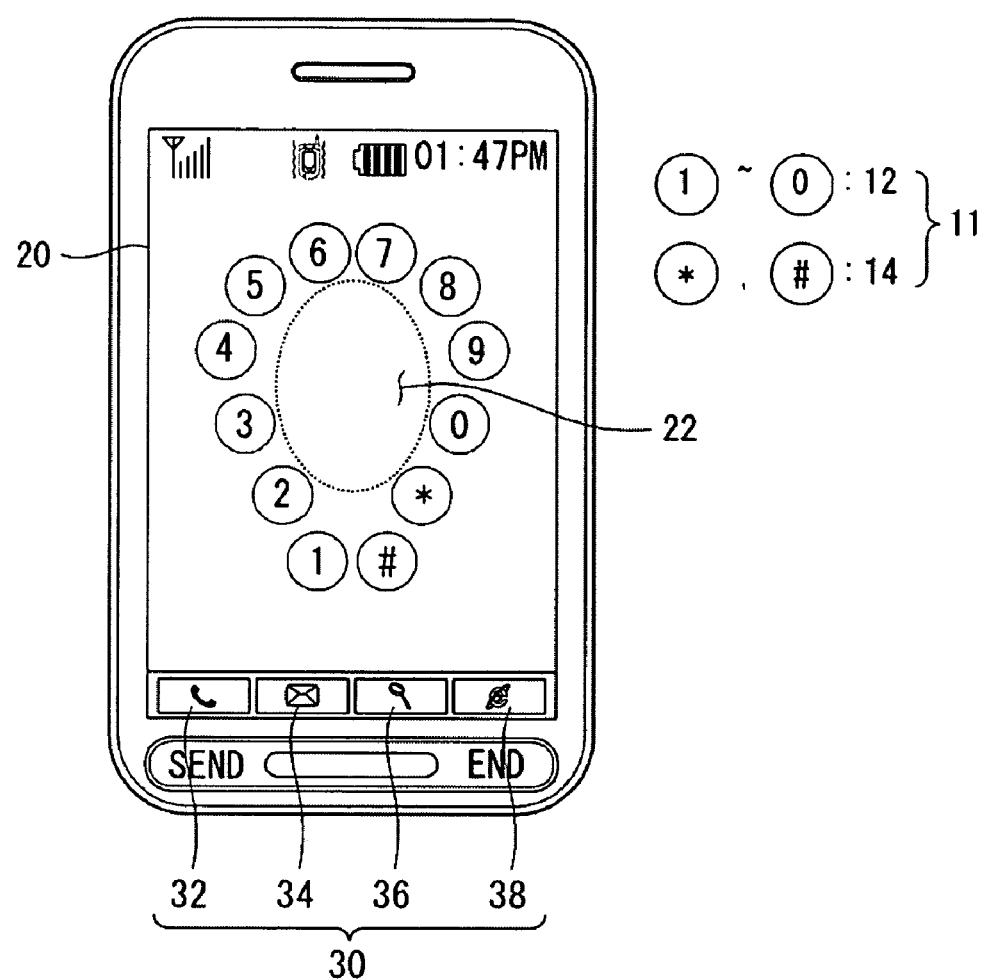
FIGS. 2A to 2C are views illustrating menu screens in accordance with an embodiment of this document.
Figure 2B:
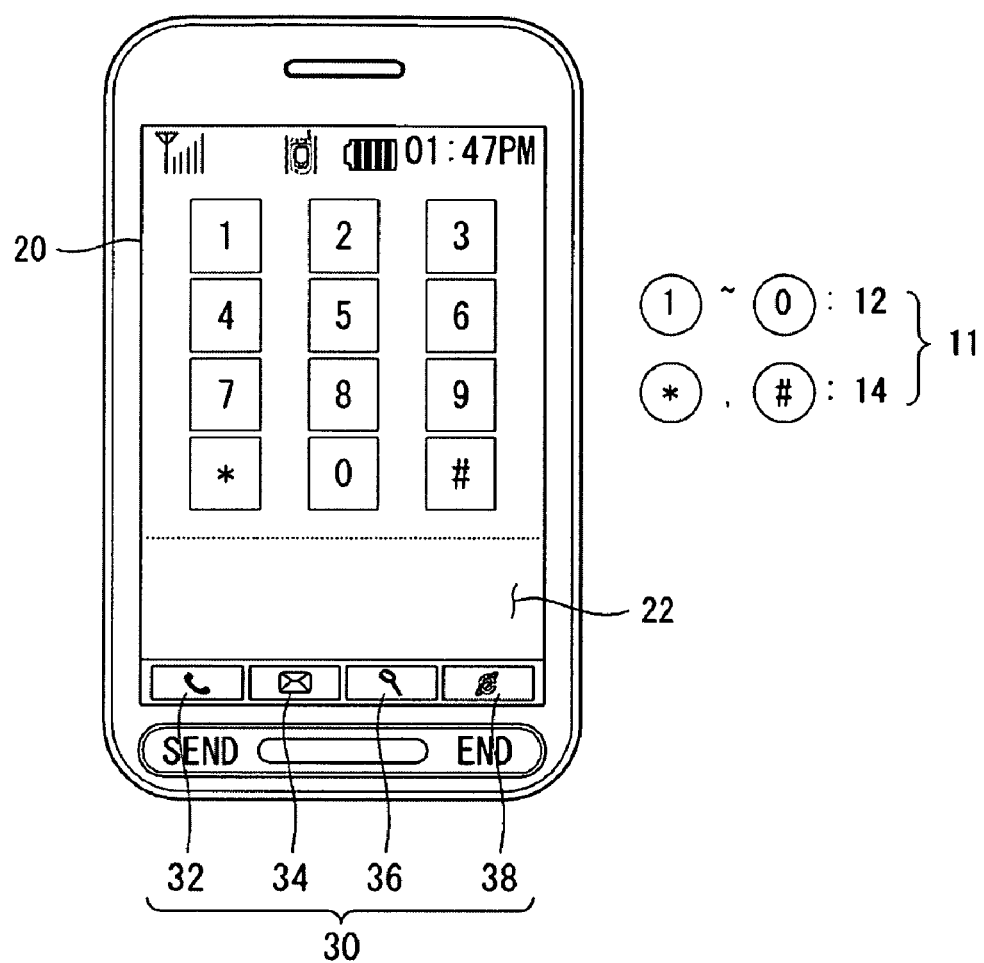
Figure 2C:
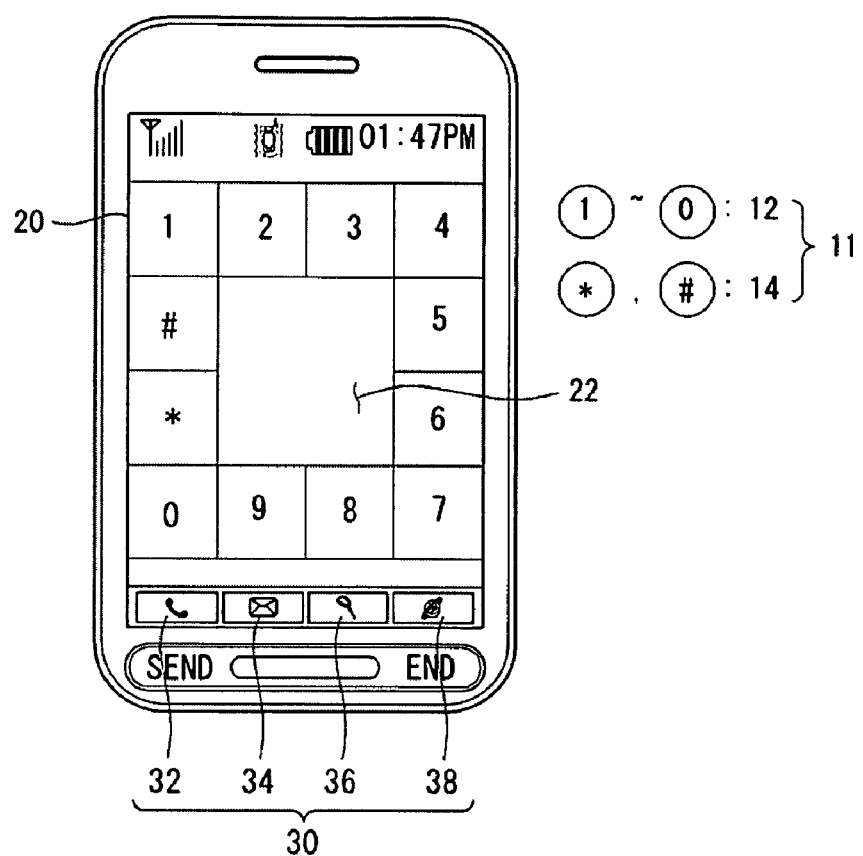

FIGS. 2A to 2C are views illustrating menu screens in accordance with an embodiment of this document.

Referring to FIGS. 2a to 2c, the menu screen 20 in accordance with an embodiment of this document may comprise an execution key 11, a control area 22, and a function icon 30.

The execution key 11 may comprise a numeric key 12 and a function key 14. The function icon 30 may comprise a call icon 32, a message icon 34, a finder icon 36, and an Internet icon 38.

Different operations may be executed according to methods in which a user touches the execution key 11. For example, when a user touches the execution key 11 for a time period shorter than a specific time period (short touch), when a user touches the execution key 11 for a time period longer than a specific time period (for a long time touch), and when a user slides into the control area 22 or the function icon 30 in a state where the execution key 11 is touched, different operations may be performed. In a similar way, different operations may be performed according to methods in which a user touches the function icon 30.

Although not shown in FIGS. 2a to 2c, in respective execution keys 11, basic setting menus or user setting menus corresponding the respective execution keys 11 may be displayed.

The basic setting menus or the user setting menus may be implemented using the execution key 11.

Figure 3:
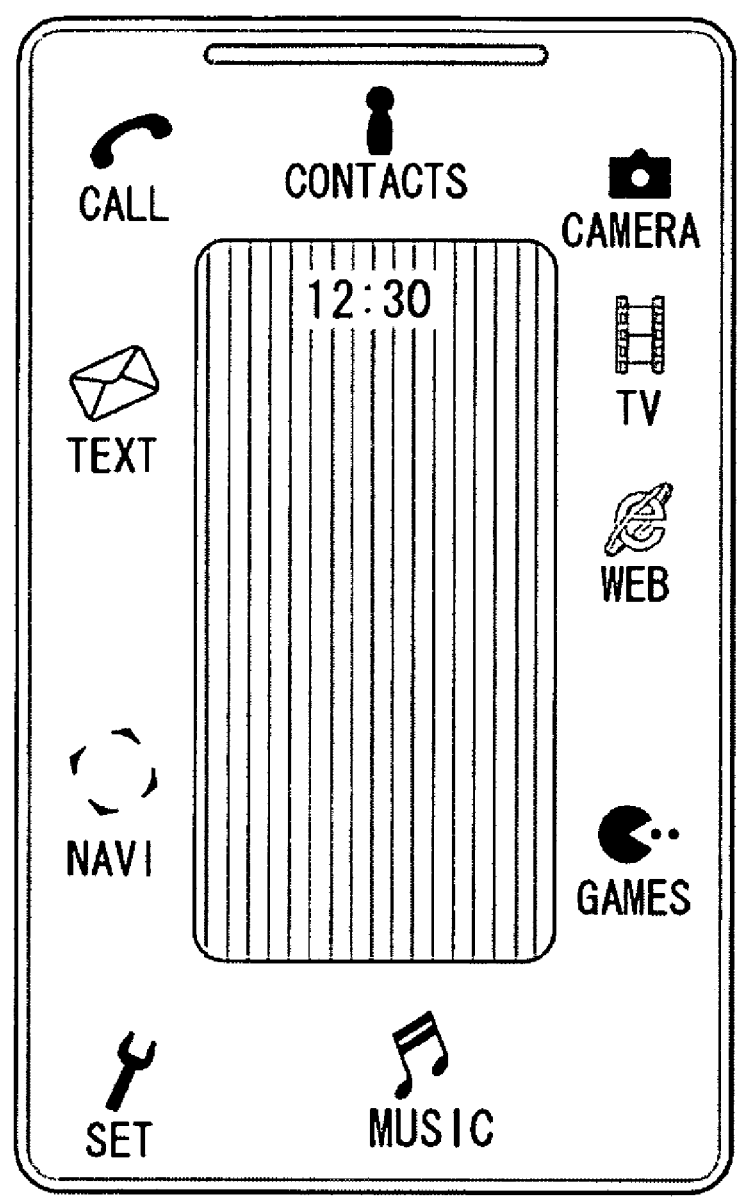
FIG. 3 is a view illustrating a menu screen in which an execution key of FIG. 2C is implemented using basic setting menus or user setting menus.

FIG. 3 is a view illustrating a menu screen in which the execution key of FIG. 2C is implemented using basic setting menus or user setting menus.

Respective execution keys 11 may be assigned corresponding short-cut menus (basic setting menus or user setting menus), short-cut telephone numbers, short-cut folder names, short-cut URL information, and so on.

Table 1 lists an example in which respective execution keys and corresponding short-cut information are assigned.

TABLE 1

| Execution key | Short-cut menu name | Short-cut telephone number | Short-cut folder name | Short-cut URL |
|---|---|---|---|---|
| 1 | Business man | 010-1234-5678 | built-in/ camera album | www.lge.com |
| 2 | Telephone directory | 019-777-1004 | built-in/ music box | www.naver.com |
| ... | ... | ... | ... | ... |
| 0 | Internet | X | external/ camera album | X |
| * | camera | X | X | X |
| # | MP3 | X | X | X |

Referring to Table 1, a No. 1 numeric key 12 is assigned "business menu" as the short-cut menu name, "010-1234-5678" as the short-cut telephone number, "built-in/camera album" as the short-cut folder name, and www.lge.com as the short-cut URL. Further, a No. 2 numeric key 12 is assigned "telephone directory" as the short-cut menu name, "019-777-1004" as the short-cut telephone number, "built-in/music box" as the short-cut folder, and "www.naver.com" as the short-cut URL.

Further, a No. 0 numeric key 12 is assigned "Internet" as the short-cut menu name and "external/camera album" as the short-cut folder name. The short-cut telephone number and the short-cut URL are assigned nothing.

Hereinafter, an example in which different operations are performed according to methods in which a user touches the execution key 11 or the function icon 30 is described. Specifically, operations when a user touches the execution key 11 or the function icon 30 for a short time or for a long time, when a user slides the execution key 11 into the control area 22 or the function icon 30 in a state where the execution key 11 is touched, or when a user multi-touches the execution key 11 are described separately.

<Short Touch (Touch for a Short Time)>

In the present embodiment, the term "short touch (touch for a short time)" refers to a case where after the execution key 11 or the function icon 30 is touched, a time period taken to release the touch is shorter than a specific time period.

1. Short Touch of Execution Key

1) Input of Number or Symbol

If a user touches the numeric key 12 or the function key 14 for a short time, the controller 5 determines that there is a number input included in the touched numeric key 12 or a symbol input included in the function key 14. In response thereto, the controller 5 controls a number or a symbol, which is included in the touched execution key 11, to be displayed on the control area 22. Hence, the user can check whether his desired number or symbol has been input correctly through the information displayed on the control area 22.

If a user wants to input a number having two or more digits in order to input a telephone number, the user can input a specific telephone number by consecutively touching the numeric key 12 for a short time.

For example, in order to input a telephone number "02-552-2398", a user can input the telephone number by touching the numeric key 12, including numbers 0, 2, 5, 5, 2, 2, 3, 9, and 8, consecutively and shortly.

2) Execution of Short-Cut Menu

In the case where a user touches the execution key 11 short, a short-cut menu corresponding to the touched execution key 11 may be implemented to operate. In Table 1, if a user touches the No. 1 numeric key 12 shortly, the businessman menu may be executed, and if a user touches the No. 2 numeric key 12 shortly, the telephone directory menu may be executed. Here, the short-cut menu may be a basic setting menu set by default or a user setting menu set by a user.

2. Short Touch of Function Icon

In FIGS. 2a to 2c, if a user touches the call icon 32 shortly, the controller 5 controls a telephone number entry screen for inputting a telephone number to be called to be displayed.

If a user touches the message icon 34 for a short time, the controller 5 controls a screen to switch to a message write screen for message transmission or a screen for inputting a telephone number of a counterpart to which a message will be sent.

If a user touches the finder icon 36 or the Internet icon 38 shortly, the controller 5 controls a content finder or Internet access to be executed.

<Lone Touch (Touch for a Long Time)>

In the present embodiment, a term "long touch (touch for a long time)" refers to a case where after the execution key 11 or the function icon 30 is touched, a time period taken to release the touch is longer than a specific time period.

1. Long Touch of Execution Key

If a user touches the execution key 11 for a long time, a function, such as a call or message transmission to a short-cut telephone number assigned to the execution key 11 is performed, direct movement to a short-cut folder, or access to a short-cut URL, may be performed. Of course, if this function is to be performed, a short-cut telephone number, a short-cut folder or a short-cut URL assigned to the execution key 11 must exist.

Figure 4:
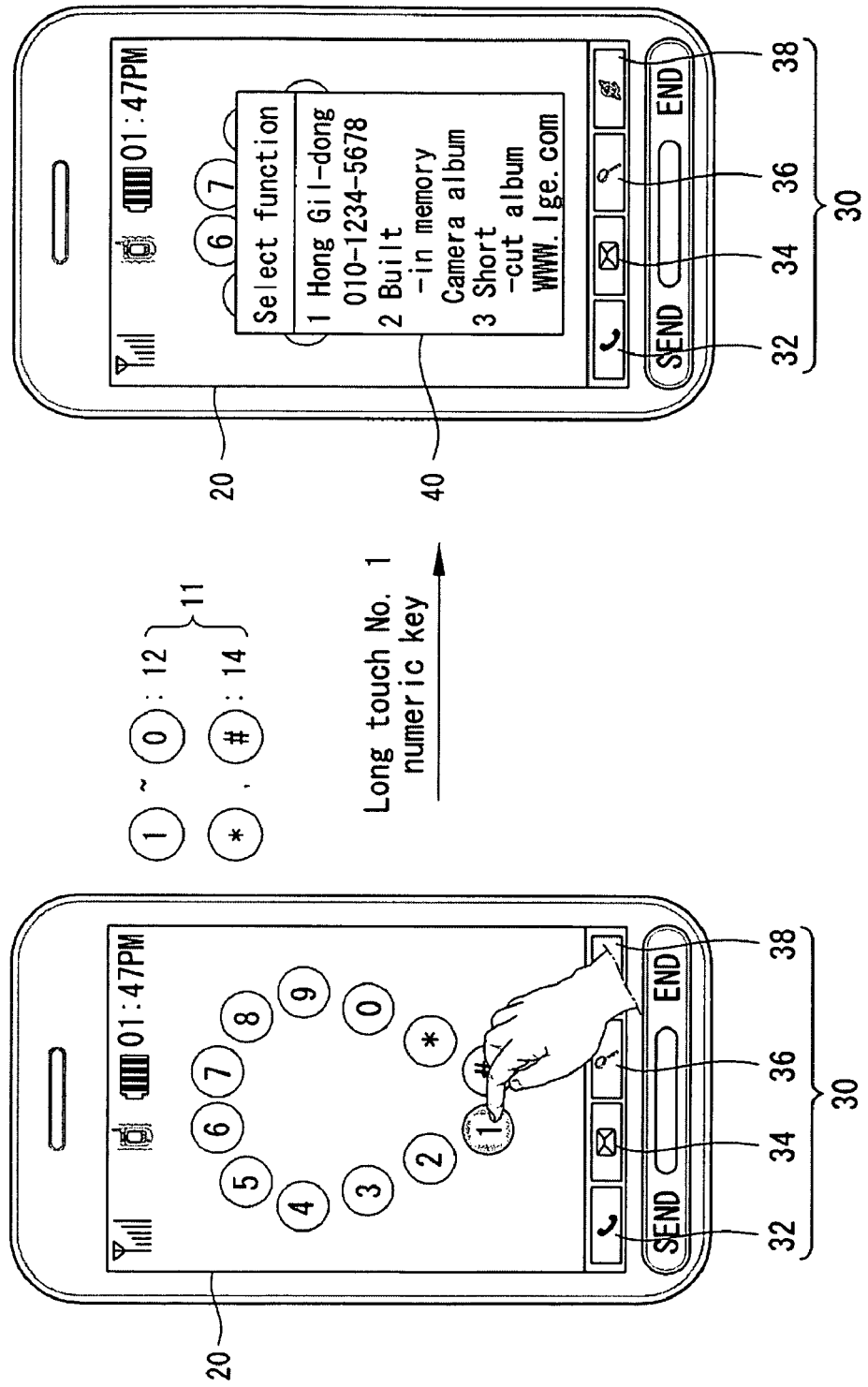
FIG. 4 is a view illustrating a control operation in accordance with an embodiment of this document when the execution key is touched for a long time.

FIG. 4 is a view illustrating a control operation in accordance with an embodiment of this document when the execution key is touched long.

Referring to FIG. 4, if a user touches the No. 1 numeric key 12 long, the controller 5 controls a function select window 40, comprising short-cut information assigned to the No. 1 numeric key 12, such as a short-cut telephone number, a short-cut folder name and a short-cut URL information, to be displayed.

If the user touches the call icon 32, the controller 5 controls call connection to "1010-1234-5678" (that is, a short-cut telephone number corresponding to the No. 1 numeric key 12) to be attempted. Further, if the user touches the message icon 34, the controller 5 controls the message write screen for performing message transmission to "010-1234-5678" (that is, a short-cut telephone number corresponding to the No. 1 numeric key 12) to be displayed.

If the user touches the short-cut folder name (that is, a No. 2 item) or the finder icon 36, the controller 5 controls the menu to enter the "camera album" folder (that is, the short-cut folder).

If the user touches the short-cut URL (that is, a No. 3 item) or the Internet icon 38, the controller 5 controls Internet access to www.lge.com (that is, the short-cut URL) to be executed.

In the above embodiment, it has been described that if a user touches the execution key 11 for a long time, the function select window 40, comprising the entire short-cut information assigned to the touched execution key 11, is displayed. However, this document is not limited thereto.

In other words, a specific function of the entire short-cut information assigned to the touched execution key 11 may be implemented. An executed specific function may be changed by a user. For example, if a user touches a specific one of the numeric key 12 long, a call to a short-cut telephone number assigned to the touched numeric key 12 may be directly performed.

Figure 5:
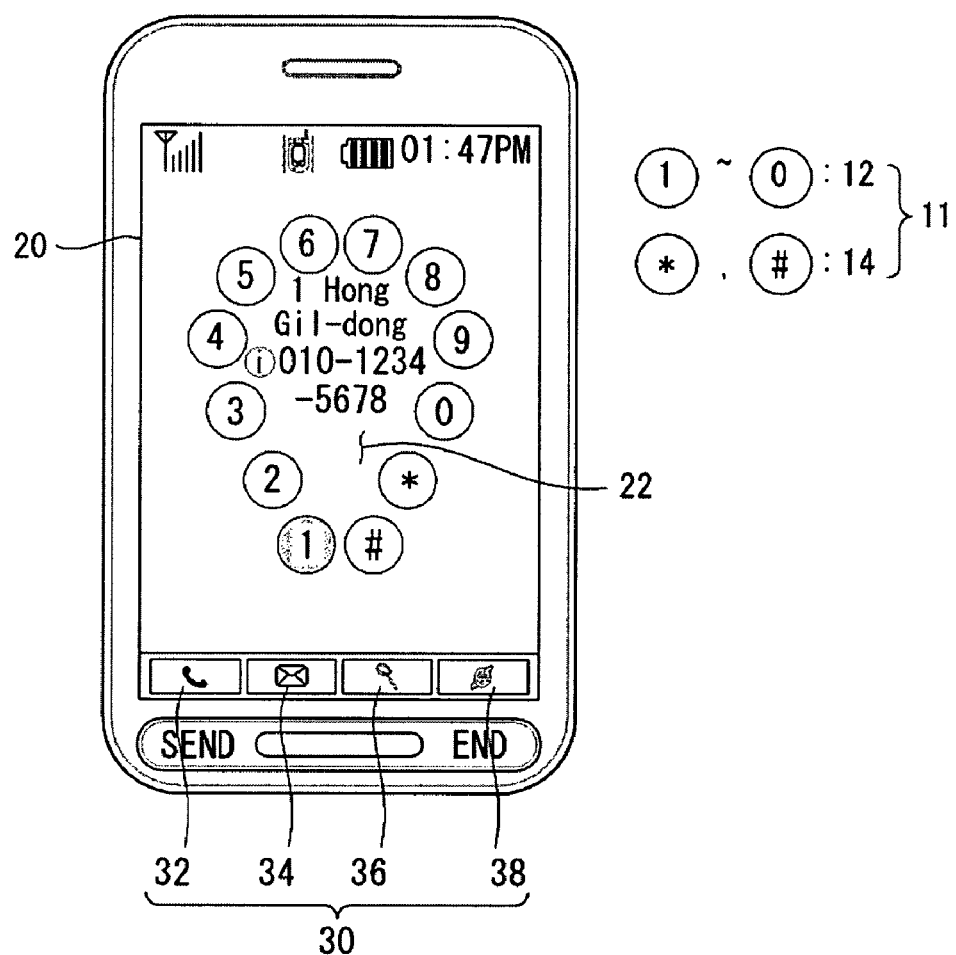
FIG. 5 is a view illustrating an embodiment in which a call is performed using a short-cut telephone number when the execution key is touched for a long time.

FIG. 5 is a view illustrating an embodiment in which a call is performed using a shortcut telephone number when the execution key is touched long.

Referring to FIG. 5, if a user touches the No. 1 numeric key 12 long, the controller 5 may control a short-cut telephone number (for example, 010-1234-5678) and a name (for example, Hong Gil-dong), which are assigned to the No. 1 numeric key 12, to be displayed on the control area 22 and control call connection to the short-cut telephone number to be performed after a specific time period (for example, 0.8 seconds later).

In the above embodiment, it has been described that after the short-cut telephone number and the name assigned to the numeric key 12 are displayed on the control area 22, call connection to the short-cut telephone number to be performed after a specific time period. However, it is to be understood that call connection may be performed simultaneously when the short-cut telephone number and the name are displayed on the control area 22.

2. Long Touch of Function Icon

If a user touches the function icon 30 (that is, the call icon 32, the message icon 34, the finder icon 36, the Internet icon 38, etc.) for a long time, the touched function icon 30 may operate as a hot key.

That is, if the user touches the call icon 32 long, the controller 5 controls a recent call history screen to be displayed. If the user touches the message icon 34 long, the controller 5 controls a message write screen for message transmission or a screen for inputting a counterpart's telephone number to which a message will be sent to be displayed.

Further, if the user touches the finder icon 36 for a long time, the controller 5 controls a recently searched content seek folder to be entered. If the user touches the Internet icon 38 long, the controller 5 controls Internet access to the most recently accessed Internet website to be executed.

<Touch and then Slide>

1. Slide into Function Icon after Execution Key is Touched

Figure 6:
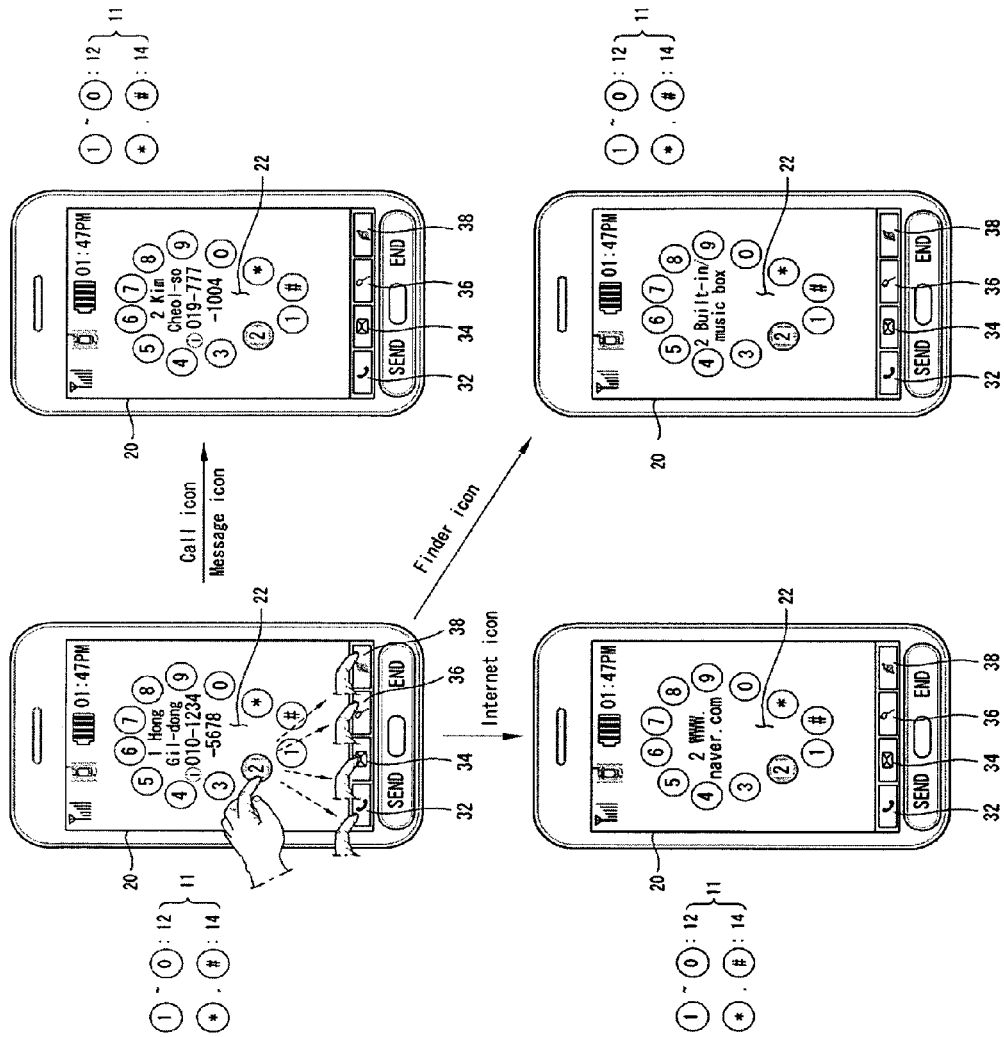
FIG. 6 is a view illustrating a control operation in accordance with an embodiment of this document when the execution key slides into a function icon area in a state where the execution key is touched.

FIG. 6 is a view illustrating a control operation in accordance with an embodiment of this document when the execution key slides into the function icon area in a state where the execution key is touched.

Referring to FIG. 6, if, in a state where the No. 2 numeric key 12 is touched, a user slides the touched No. 2 numeric key 12 into the call icon 32 or the message icon 34, the controller 5 controls a short-cut telephone number and a name, assigned to the No. 2 numeric key 12, to be displayed on the control area 22.

If the No. 2 numeric key 12 slides into the call icon 32, the controller 5 controls call connection to a short-cut telephone number, which is assigned to the No. 2 numeric key 12, to be performed.

If the No. 2 numeric key 12 slides into the message icon 34, the controller 5 controls the message write screen for performing message transmission to a short-cut telephone number assigned to the No. 2 numeric key 12 to be displayed.

If, in a state where a user touches the No. 2 numeric key 12, the touched No. 2 numeric key 12 slides into the finder icon 36, the controller 5 controls a "music box" (that is, the short-cut folder name assigned to the No. 2 numeric key 12) to be displayed on the control area 22 and then controls the "music box" folder (that is, the short-cut folder) to be entered after a specific time period (for example, about 0.8 seconds).

If, in a state where a user touches the No. 2 numeric key 12, the touched No. 2 numeric key 12 slides into the Internet icon 38, the controller 5 controls www.naver.com (that is, the short-cut URL assigned to the No. 2 numeric key 12) to be displayed on the control area 22 and then controls Internet access to www.naver.com (that is, the short-cut URL) to be performed after a specific time period (for example, about 0.8 seconds).

In the above embodiment, an example in which in a state where a specific execution key 11 is touched, a menu slides into the function icon 30 has been described. However, this document is not limited to the above example. For example, this document may be applied to an example in which in a state where the function icon 30 is touched, the touched function icon 30 slides into a specific execution key 11 in the same manner.

Further, an example in which short-cut information is assigned to touched execution keys has been described. Hereinafter, an example in which short-cut information is not assigned to touched execution keys is described.

When in a state where a specific execution key 11 is touched, the touched execution key 11 slides into the call icon 32 or the message icon 34, if there is no short-cut telephone number assigned to the touched execution key 11, the controller 5 controls a short-cut telephone number setting screen for assigning a short-cut telephone number to the touched execution key 11 to be displayed. A user can set a short-cut telephone number corresponding to the touched execution key 11 by employing the short-cut telephone number setting screen.

In a similar way, when in a state where a specific execution key 11 is touched, the touched execution key 11 slides into the finder icon 36 or the Internet icon 38, if there is no short-cut telephone number assigned to the touched execution key 11, the controller 5 controls a short-cut folder setting screen or a URL setting screen to be respectively displayed. In the short-cut folder setting screen or the URL setting screen, a user can set a short-cut folder or URL corresponding to the touched execution key 11.

2. Slide into Control Area after Execution Key is Touched

Figure 7:
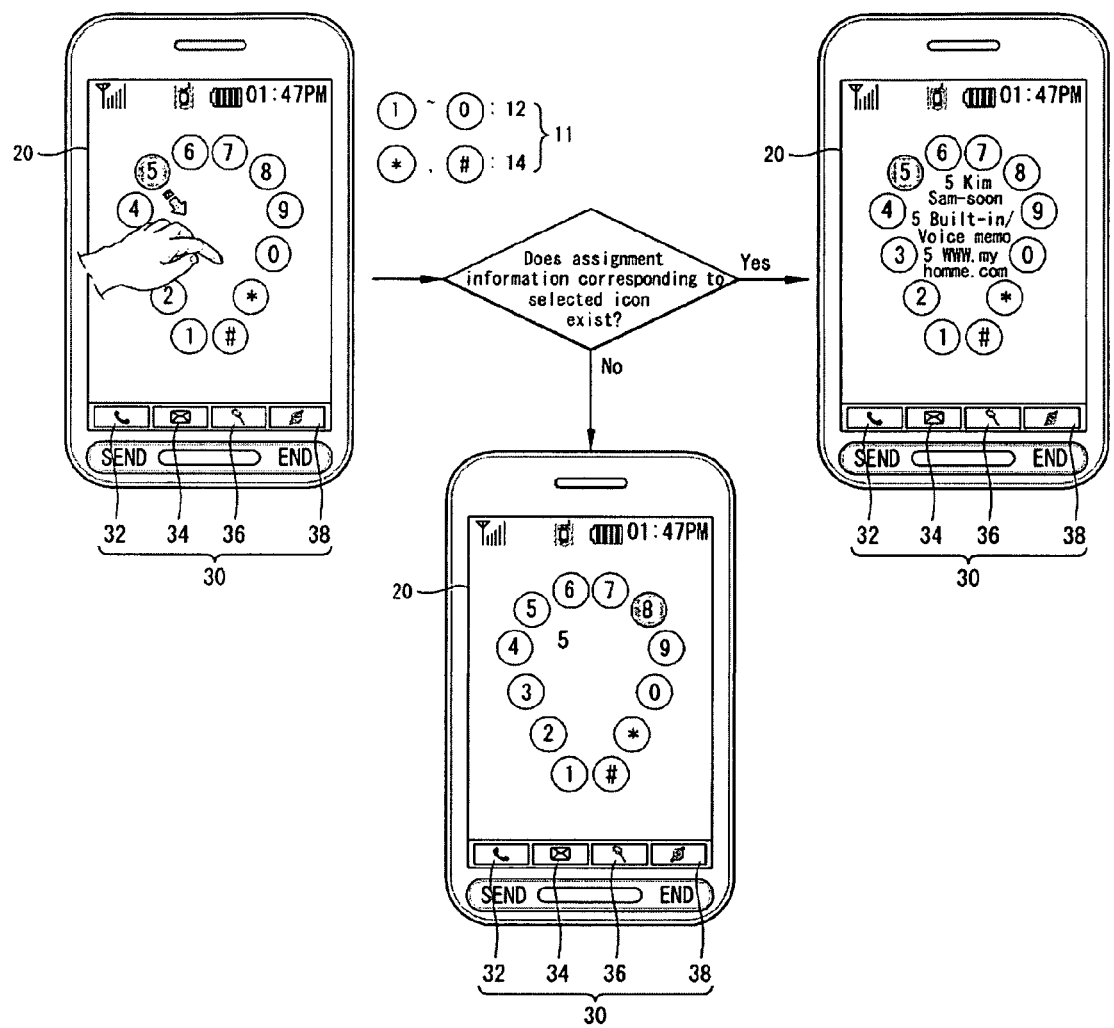
FIG. 7 is a view illustrating a control operation in accordance with an embodiment of this document when the execution key slides into a control area in a state where the execution key is touched.

FIG. 7 is a view illustrating a control operation in accordance with an embodiment of this document when the execution key slides into the control area in a state where the execution key is touched.

Referring to FIG. 7, if a user slides into the control area 22 in a state where the No. 5 numeric key 12 is touched, the controller 5 determines whether there exists one or more short-cut information assigned to the touched No. 5 numeric key 12.

If, as a result of the determination, one or more short-cut information exists, the controller 5 controls the entire short-cut information, which is assigned to the touched No. 5 numeric key 12, to be displayed on the control area 22.

Thereafter, if the user touches the call icon 32 or the message icon 34, the controller 5 controls call connection to a short-cut telephone number, which is assigned to the No. 5 numeric key 12, to be performed, or controls a message write screen to be displayed so that a message can be sent to an assigned short-cut telephone number.

If the user touches the finder icon 36, the controller 5 controls the menu to enter a short-cut folder assigned to the No. 5 numeric key 12. If the user touches the Internet icon 38, the controller 5 controls Internet access to an URL, which is assigned to the No. 5 numeric key 12, to be performed.

In the above embodiment, it has been described that short-cut information assigned to the execution key 11 is displayed on the control area 22. However, it is to be understood that a pop-up window, comprising short-cut information assigned to the execution key 11, may be displayed.

Further, it has been described that in the case where, in a state where a specific execution key 11 is touched, a user slides the touched execution key 11 into the control area 22, the entire short-cut information corresponding to the execution key 11 is displayed. However, the technical spirit of this document is not limited to the above embodiment.

That is, if a user slides into the control area 22 in a state where the execution key 11 is touched, only a specific function can be executed. For example, call connection to a short-cut telephone number corresponding to the touched execution key 11 may be performed immediately or a message write screen for performing message transmission to a short-cut telephone number may be displayed immediately. Here, an item regarding which function will be executed can be decided by a user.

On the other hand, if, as a result of the determination, short-cut information assigned to the execution key 11 does not exist, the controller 5 controls a number or a symbol included in the execution key 11 to be displayed on the control area 22. Referring to FIG. 7, if short-cut information assigned to the No. 5 numeric key 12 does not exist, the controller 5 controls a number "5" to be displayed on the control area 22.

Figure 8A:
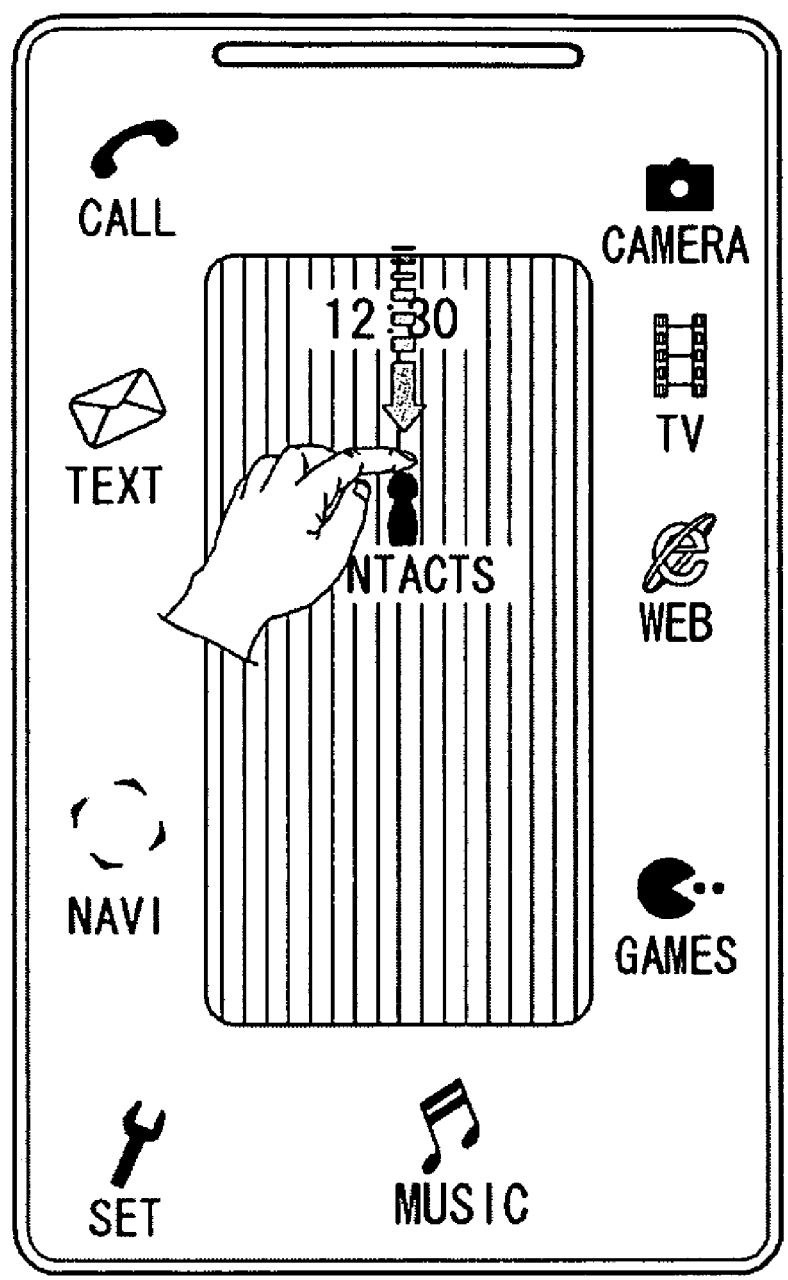
FIGS. 8A to 8C are views illustrating a control operation in accordance with another embodiment of this document when the execution key slides into a control area in a state where the execution key is touched.
Figure 8B:
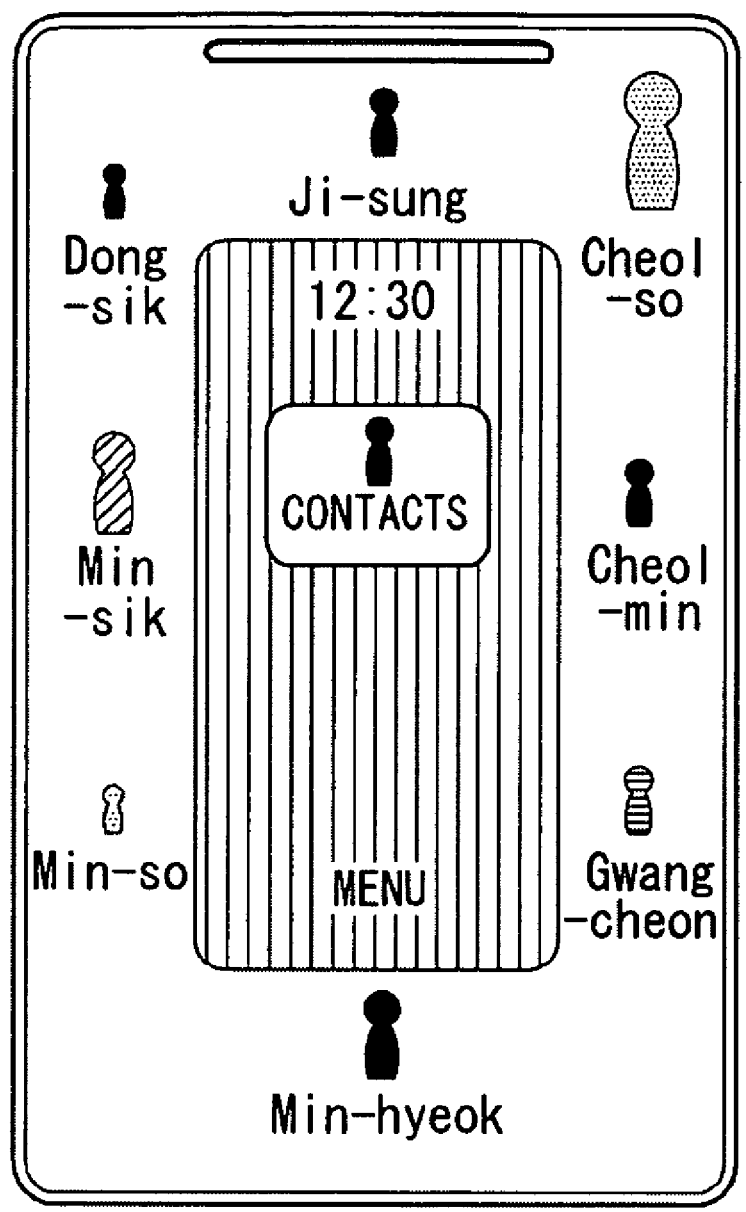
Figure 8C:
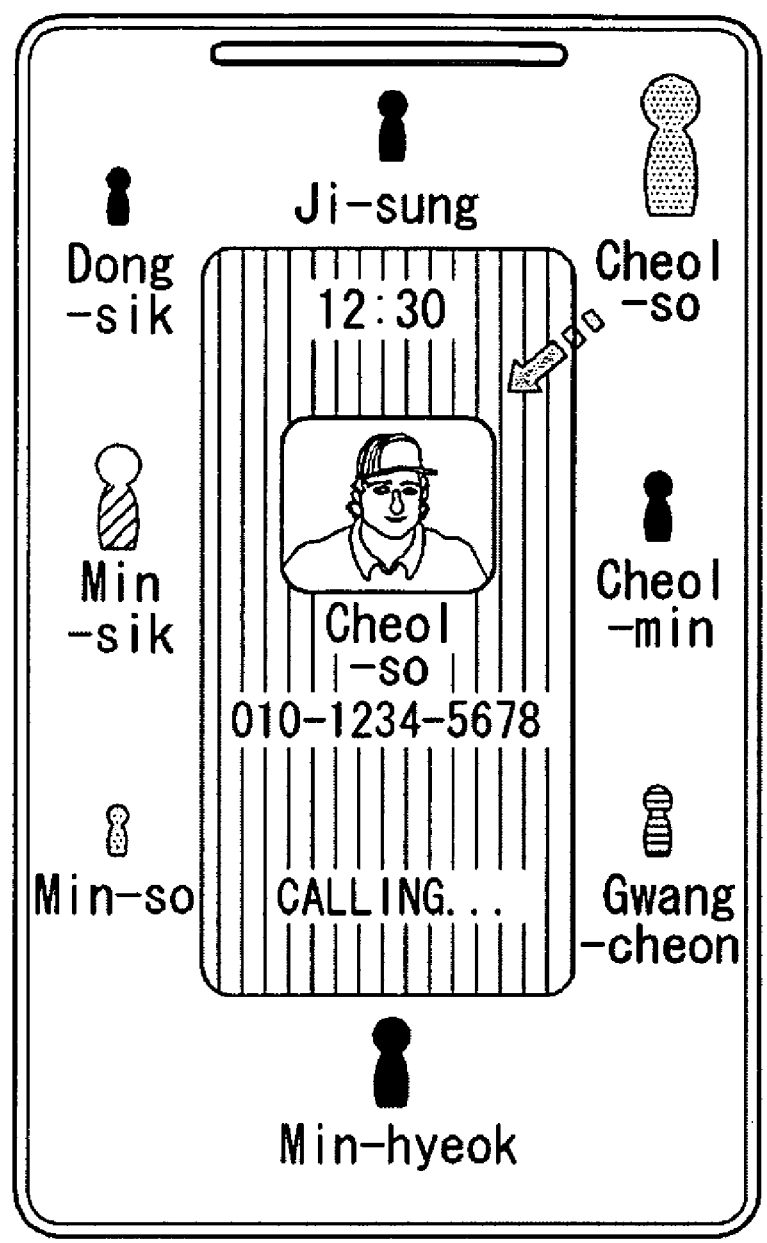

FIGS. 8A to 8C are views illustrating a control operation in accordance with another embodiment of this document when the execution key slides into the control area in a state where the execution key is touched. In FIG. 8, the execution key is implemented using the basic setting menu or the user setting menu as shown in FIG. 3.

Referring to FIG. 8A, in the menu screen shown in FIG. 3, after a user touches a contact (CONTACTS) execution key, he can slide the touched contact execution key into the control area 22.

In this case, an outer area of the control area 22 is changed to a name, which is registered with a telephone directory, and an icon corresponding to the name as shown in FIG. 8B. Here, the size and color of the icon can be displayed differently depending on whether the telephone number is frequently used, current position information or state and/or the like.

If a user touches a specific icon and then slides into the control area 22 as shown in FIG. 8C, a photograph, a name, a telephone number, and so on, which correspond to the specific icon, are displayed in the control area 22 and call connection to a corresponding telephone number is performed.

<Multi-Touch>

As another embodiment of this document, a method employing a multi-touch is described below.

In the present embodiment, the term "multi-touch" refers to a case where there are two or more touch inputs.

As an embodiment, in the case where a user multi-touches the execution key 11 and the control area 22, the same control operation as that in which the user slides into the control area 22 in a state where the execution key 11 is touched can be executed.

In a similar way, in the case where a user multi-touches the execution key 11 and the function icon 30, the same control operation as that in which the user slides into the function icon 30 in a state where the execution key 11 is touched can be executed.

In the above embodiment, a case where the function icon 30 comprises the call icon 32, the message icon 34, the finder icon 36, and the Internet icon 38 has been described as an example. However, this document is not limited to the above example. For example, the function icon 30 may be implemented in various forms in order to perform a variety of functions.

As described above in connection with the various embodiments, call connection, message transmission, folder search, Internet access and/or the like can be performed conveniently using the menu screen implemented in the touch screen.

Further, an embodiment of this document is advantageous in that it can provide a convenient user interface menu environment by employing a touch type menu implemented in the touch screen.

Figure 9:
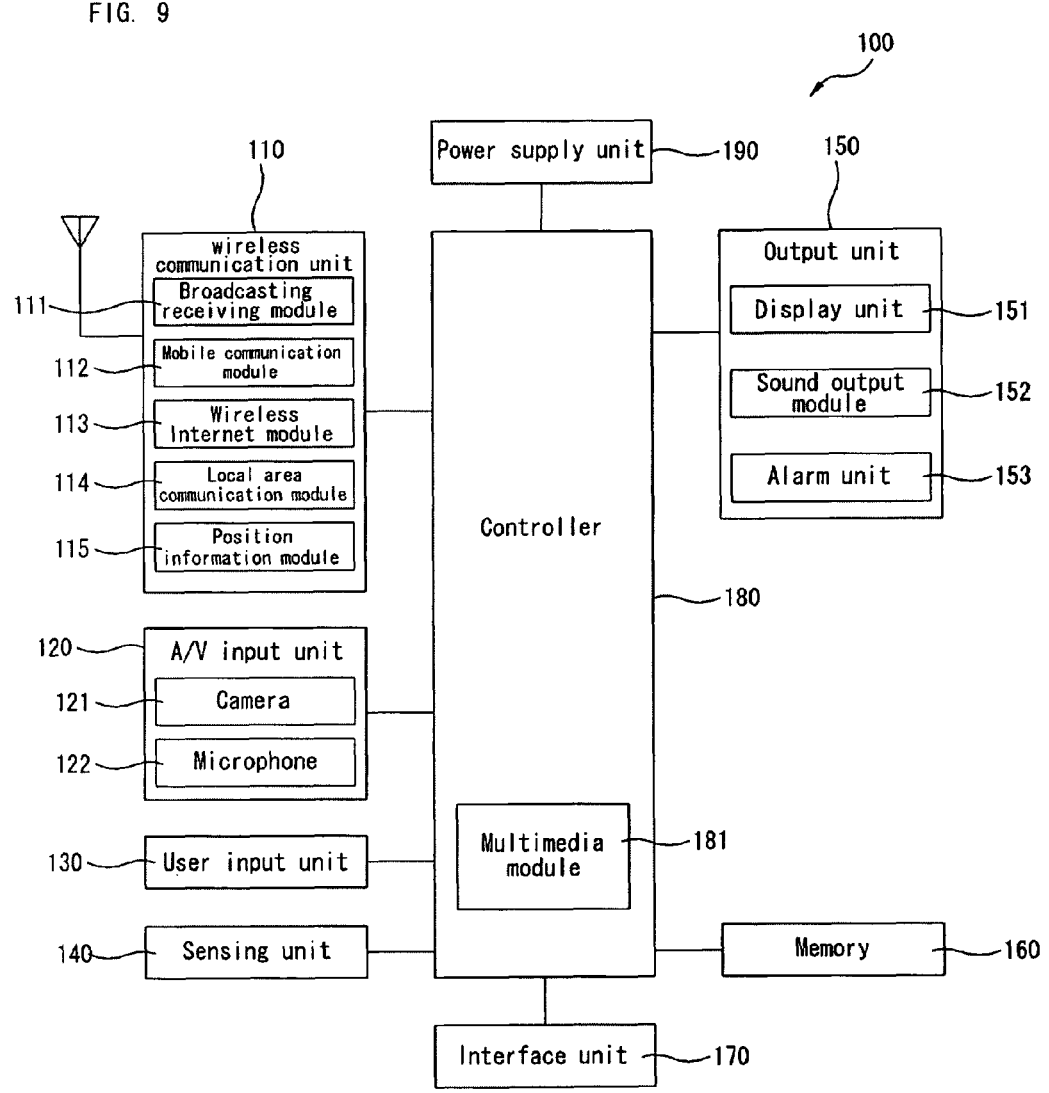
FIG. 9 is a block diagram of a communication device related to another embodiment of this document.

The communication device pertinent to this document is described below with reference to FIG. 9 from the viewpoint of constituent elements. FIG. 9 is a block diagram of a communication device related to another embodiment of this document.

The communication device 100 shown in FIG. 9 may comprise a wireless communication unit 110, an audio/video (A/V) input unit 120, a user input unit 130, a sensing unit 140, an output unit 150, memory 160, an interface unit 170, a controller 180, a power supply unit 190, and so on. FIG. 9 illustrates the communication device equipped with a variety of constituent elements. However, it is to be understood that the illustrated constituent elements are all indispensable constituent elements. For example, the communication device may be implemented using more constituent elements than the illustrated constituent elements or using less constituent elements than the illustrated constituent elements.

The constituent elements constituting the communication device 100 shown in FIG. 9 are described below sequentially.

The wireless communication unit 110 may comprise one or more constituent elements that perform wireless communication between the communication device 100 and a wireless communication system or wireless communication between the communication device 100 and a network where the communication device 100 is positioned. For example, the wireless communication unit 110 may comprise a broadcasting receiving module 111, a mobile communication module 112, a wireless Internet module 113, a local area communication module 114, a position information module 115, and so on.

The broadcasting receiving module 111 receives information pertinent to broadcasting signals and/or broadcasting from an external broadcasting management server through broadcasting channels.

Here, the broadcasting channels may comprise satellite channels, terrestrial channels and the like. The broadcasting management server may comprise a server that generates and transmits broadcasting signals and/or broadcasting related information or a server which receives predetermined broadcasting signals and/or broadcasting related information and transmits them to a communication device. Further, the broadcasting related information may comprise information pertinent to broadcasting channels, broadcasting programs or broadcasting service providers. The broadcasting signal may comprise TV broadcasting signals, radio broadcasting signals, and data broadcasting signal and also comprise broadcasting signals in which data broadcasting signals are combined with TV broadcasting signals or radio broadcasting signals.

Meanwhile, the broadcasting related information might also be provided via a mobile communication network. In this case, the broadcasting related information might be received by the mobile communication module 112.

The broadcasting related information may exist in various forms, such as EPG (Electronic Program Guide) of DMB (Digital Multimedia Broadcasting) or ESG (Electronic Service Guide) of DVB-H (Digital Video Broadcast-Handheld).

The broadcasting receiving module 111 is adapted to receive broadcasting signals by employing various broadcasting systems and can receive digital broadcasting signals by employing digital broadcasting system such as DMB-T (Digital Multimedia Broadcasting-Terrestrial), DMB-S (Digital Multimedia Broadcasting-Satellite), MediaFLO (Media Forward Link Only), DVB-H (Digital Video Broadcast-Handheld) or ISDB-T (Integrated Services Digital Broadcast-Terrestrial). Of course, the broadcasting receiving module 111 may also be configured to be suitable for the entire broadcasting systems, which provide broadcasting signals, as well as the above digital broadcasting system.

The broadcasting signals and/or the broadcasting related information received via the broadcasting receiving module 111 may be stored in the memory 160.

Further, the mobile communication module 112 transmits or receives radio signals to or from at least one of a base station, an external device, and a server over a mobile communication network. The radio signals may comprise various formats of data according to transmission/reception of voice call signals, video call signals, and texts/multimedia messages.

The wireless Internet module 113 refers to a module for wireless Internet access and may be embedded in the communication device 100 or may be external to the communication device 100.

The local area communication module 114 refers to a module for local area communication. Local area communication technologies may employ Bluetooth, RFID (Radio Frequency Identification), IrDA (infrared Data Association), UWB (Ultra Wideband), ZigBee or the like.

The position information module 115 is a module for tracking or obtaining the position of the communication device 100. For example, the position information module 115 may comprise a GPS (Global Position System) module. The GPS module receives position information from a plurality of artificial satellites. Here, the position information may comprise coordinate information represented by latitude and longitude.

For example, the GPS module can calculate a current position on the basis of three different distances using a triangulation method by employing time and distances, which are accurately measured by three or more satellites. For example, a method of obtaining distances and time information from three satellites and correcting error using one satellite may be employed. In particular, the GPS module can obtain accurate time along with 3D speed information as well as positions of the latitude, longitude, and altitude from position information received from satellites.

Meanwhile, the A/V input unit 120 is adapted to input audio signals or video signals and may comprise a camera 121 and a microphone 122. The camera 121 is adapted to process image frames, such as still images or motion images, which are captured by an image sensor in a videoconference mode or a capturing mode. The processed image frames may be displayed on a display unit 151.

The image frames processed in the camera 121 may be stored in the memory 160 or transmitted to the outside via the wireless communication unit 110. Here, two or more cameras 121 may be used according to a configuration aspect of the communication device 100.

The microphone 122 is adapted to receive external sound signals through a microphone in a call mode, a record mode, a voice recognition mode and the like and process them into electrical voice data. The processed voice data can be transformed into a format, which can be transmitted to a mobile communication base station through the mobile communication module 112 in the case of the call mode, and then output. The microphone 122 may implement a variety of noise reduction algorithms for reducing noise occurring in the process of receiving external sound signals.

The user input unit 130 is adapted to receive input operations from a user and generates input data for controlling the operation of the communication device 100. The user input unit 130 may be configured using a keypad, a dome switch, a touch pad (static pressure/static voltage), a jog wheel, a jog switch or the like. In particular, when the touch pad forms a layer structure together with the display unit 151 to be described later on, it may be called a touch screen.

The sensing unit 140 senses a current state of the communication device 100, such as whether the communication device 100 is opened or closed, the position of the communication device 100, whether a user is touched or not, the orientation of the communication device 100, and acceleration/deceleration of the communication device 100 and generates a sensing signal for controlling the operation of the communication device 100. For example, when the communication device 100 is a slide phone type, whether the slide phone is opened or not can be sensed. The sensing unit 140 can also sense whether the power supply unit 190 is supplied or not, whether the interface unit 170 is coupled to an external device and so on.

The interface unit 170 serves as an interface with the entire external devices connected to the communication device 100. For example, the entire external devices may comprise a wired/wireless headset port, an external charger port, a wired/wireless data port, a memory card port, a port connecting devices equipped with an identification module, an audio I/O (Input/Output) port, a video I/O port, an earphone port and the like. Here, the identification module is a chip in which various pieces of information for authenticating a use authority of the communication device 100 is stored and may comprise a UIM (User Identity Module), a SIM (Subscriber Identify Module), a USIM (Universal Subscriber Identity Module), and so on. Further, a device equipped with the identification module (hereinafter, referred to as "identification device") can be fabricated using a smart card type. Thus, the identification device may be connected to the communication device 100 through a port. This interface unit 170 may receive data from an external device or may be supplied with power from an external device, and transfer it to each constituent element within the communication device 100 or transfer data within the communication device 100 to an external device.

The output unit 150 is adapted to output audio signals, video signals or alarms signals and may comprise the display unit 151, a sound output module 152, an alarm unit 153, and/or the like.

The display unit 151 is adapted to display and output information processed in the communication device 100. For example, when the communication device is in a call mode, the display unit 151 displays a UI (User Interface) or GUI (Graphic User Interface) pertinent to a call. When the communication device 100 is in a videoconference mode or a capturing mode, the display unit 151 displays captured and/or received images, a UI, a GUI and/or the like.

Meanwhile, when the display unit 151 and a touch pad constitute a layer structure and are used as a touch screen as described above, the display unit 151 can also be used as an input device as well as an output device. The display unit 151 may comprise at least one of a liquid crystal display, a thin film transistor-liquid crystal display, an organic light-emitting diode, a flexible display, and a 3D display. Alternatively, two or more display units 151 may be used depending on an implementation type of the communication device 100. For example, both a display unit (not shown) and an internal display unit (not shown) may be provided in the communication device 100.

The sound output module 152 is adapted to output audio data, which is received from the wireless communication unit 110 or stored in the memory 160 in a call receiving mode, a call mode, a record mode, a voice recognition mode, a broadcasting receiving mode or the like. The sound output module 152 also outputs sound signals pertinent to functions (for example, call signal receiving sound, message receiving sound, etc.), which are performed in the communication device 100. This sound output module 152 may comprise a speaker, a buzzer, and so on.

The alarm unit 153 outputs signals to inform that events have occurred in the communication device 100. For example, the events occurring in the communication device may comprise the reception of a call signal, the reception of a message, the input of a key signal and/or the like. The alarm unit 153 may also output signals to inform the occurrence of events as other forms as well as the audio signals or the video signals. For example, the signals may be output as a vibration form. When a call signal or a message is received, the alarm unit 153 may generate vibration in order to inform the reception of the call signal or message. Alternatively, when a key signal is received, the alarm unit 153 may generate vibration as a feedback to the input of the key signal. A user can notice the occurrence of the events through the output of vibration. The signals to inform the occurrence of the events may also be output through the display unit 151 or the sound output module 152.

The memory 160 may store programs for processing and controlling the communication terminal 100 and may also function to temporarily store input/output data (for example, phonebook, messages, still images, motion images, etc.).

The memory 160 may comprise at least one type of a storage medium selected from a flash memory type, a hard disk type, a multimedia card micro type, card type memory (for example, SD or XD memory), RAM (Random Access Memory), SRAM (Static Random Access Memory), ROM (Read-Only Memory), EEPROM (Electrically Erasable Programmable Read-Only Memory), PROM (Programmable Read-Only Memory), magnetic memory, a magnetic disc, and an optical disk. Further, the communication device 100 may also operate web storage for performing the storage function of the memory 160 on Internet.

The controller 180 typically controls an overall operation of the communication device 100. For example, the controller 180 performs pertinent control and processes for voice call, data communication, videoconference and the like. Further, the controller 180 may comprise a multimedia module 181 for multimedia play. The multimedia module 181 may be implemented within the controller 180 or separately from the controller 180.

A power supply unit 190 receives external power or internal power and supplies power necessary for the operation of each constituent element under the control of the controller 180.

The various embodiments described above may be implemented within a computer-readable recording medium by employing, for example, software, hardware, or a combination of them.

In terms of hardware implementations, embodiments described herein may be implemented using at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, micro-controllers, microprocessors, and an electrical unit for performing functions. In this case, the embodiments may be implemented using the controller 180.

In terms of software implementations, embodiments, such as procedures or functions, may be implemented together with separate software modules adapted to execute at least one function or operation. Software codes may be implemented using software applications written in a proper program language. Further, software codes may be stored in the memory 160 and executed by the controller 180.

The communication device pertinent to this document has been described above from the viewpoint of the constituent elements according to their functions. The communication device pertinent to this document will be described below from the viewpoint of the constituent elements according to its external appearance with further reference to FIGS. 10 and 11. Further, for simplicity of description, a slide type communication device of several types of communication devices, including a folder type, a bar type, a swing type, and a slide type, will be described as an example. Hence, it is to be understood that this document is not limited to the slide type communication device, but can be applied to the entire types of communication devices comprising the above types.

Figure 11:
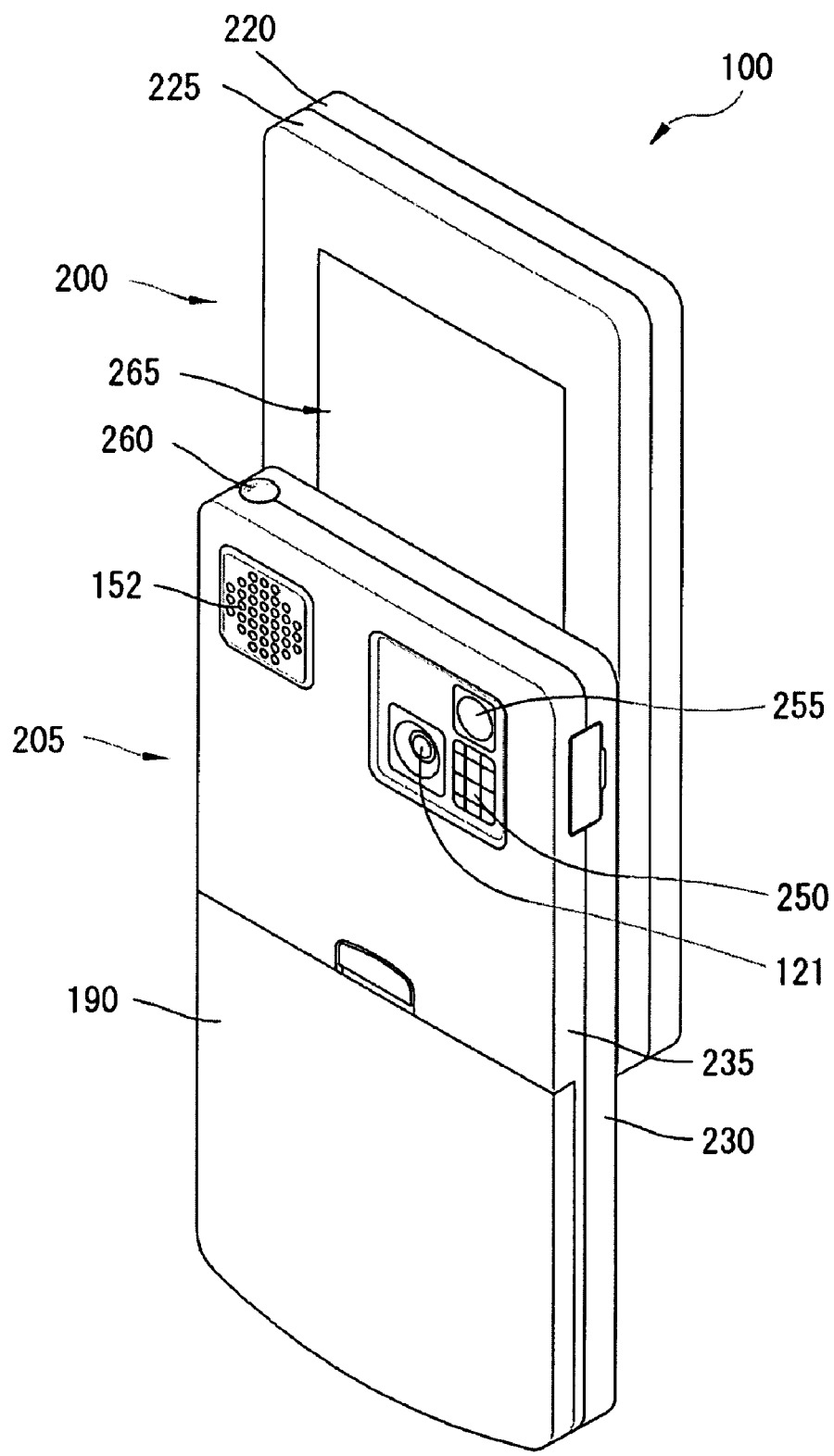
FIG. 11 is a rear perspective view of the communication device related to another embodiment of this document.

FIG. 11 is a rear perspective view of the communication device related to another embodiment of this document.

The communication device 100 in accordance with this document comprises a first body 200, and a second body 205 configured to slide in at least one direction in the first body 200.

Meanwhile, in the case where the communication device 100 according to this document is a folder type, the communication device 100 may comprise a first body, and a second body having at least side configured to fold to or unfold from the first body.

A configuration in which the first body 200 is disposed to overlap with the second body 205 may be called a closed configuration. A configuration in which at least one part of the second body 205 is exposed through the first body 200 as shown in the drawing may be called an open configuration.

The communication device 100 usually operates in a standby mode in the closed configuration, but the standby mode of the communication device 100 can be released by manipulation of a user. Further, the communication device 100 usually operates in a call mode in the opened configuration, but can be switched to a standby mode by manipulation of a user or after a lapse of a specific time.

A case (casing, housing, cover) constituting an external appearance of the first body 200 comprises a first front case 220 and a first rear case 225. A variety of electronic components are embedded within a space formed by the first front case 220 and the first rear case 225. At least one intermediate case may be additionally disposed between the first front case 220 and the first rear case 225.

The cases may be formed by injecting synthetic resin or using metal material, such as STS (Stainless Steel) or titanium (Ti).

The display unit 151, the sound output module 152, the camera 121 or the first user input unit 210 may be disposed in the first body 200, specifically, the first front case 220.

The display unit 151 may comprise a LCD, an OLED or the like for visually displaying information.

The display unit 151 may be overlapped with a touch pad in a layer structure. Accordingly, the display unit 151 may operate as a touch screen, thereby enabling the input of information through a user's touch.

The sound output module 152 may be implemented in a speaker form.

The camera 121 may be implemented to capture images or motion images of a user, etc.

In the same manner as the first body 200, a case constituting an external appearance of the second body 205 is formed by a second front case 230 and a second rear case 235.

A second user input unit 215 may be disposed in the second body 205, specifically, on a front face of the second front case 230.

A third user input unit 245, the microphone 122, and the interface unit 170 may be disposed in at least one of the second front case 230 and the second rear case 235.

The first to third user input units 210, 215, and 245 can be collectively called the user input unit 130 and may adopt any tactile method if a user can manipulate the user input unit 130 while getting a tactile feeling.

For example, the user input unit 130 may be implemented using a dome switch or a touch pad, which can receive commands or information through push or touch by a user, a method employing a wheel for rotating a key, a jog or a joystick or the like.

From a functional viewpoint, the first user input unit 210 is adapted to input commands such as start, end, and scroll. The second user input unit 215 is adapted to input numbers, texts, symbols and the like. Further, the third user input unit 245 may operate as a hotkey for activating special functions within the communication device.

The microphone 122 may be implemented in a form suitable to receive voice, other sound, etc. of a user.

The interface unit 170 becomes a passage that enables the communication device pertinent to this document to perform data exchange, etc. with external devices. For example, the interface unit 170 may be at least one of a terminal connecting to an earphone, a port (for example, an IrDA port, a Bluetooth port, a wireless LAN, etc.), and a power supply terminal for supplying power to the communication device in a wired or wireless manner.

The interface unit 170 may be a card socket for accommodating external cards, such as a SIM, (Subscriber Identity Module), UIM (User Identity Module), and a memory card for information storage.

The power supply unit 190 for supplying power to the communication device 100 is disposed on the part of the second rear case 235.

The power supply unit 190 is, for example, a rechargeable battery and may be detachably coupled for recharging, etc.

Figure 10:
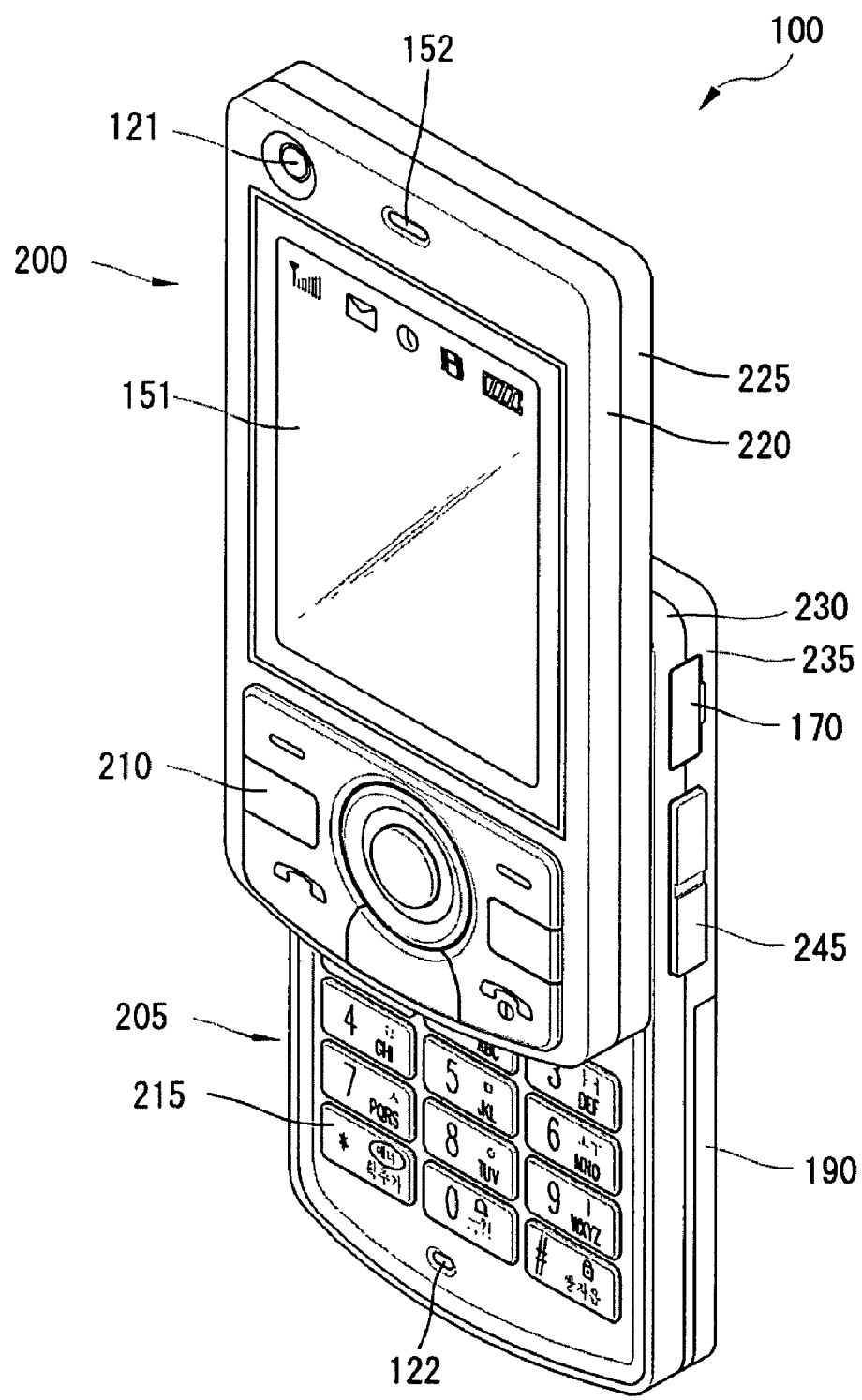
FIG. 10 is a front perspective view of the communication device related to another embodiment of this document.

FIG. 11 is a rear perspective view of the communication device shown in FIG. 10.

Referring to FIG. 11, the camera 121 may be additionally mounted in the rear side of the second rear case 235 of the second body 205. The camera 121 mounted in the second body 205 has a photographing direction, which is substantially opposite to that of the camera 121 of the first body 200, and may have different pixels from that of the camera 121 of the first body 200.

For example, the camera 121 of the first body 200 may have low pixels so that it does not have a difficulty in photographing the face of a user and transmitting the photographed image to a counterpart, in the case of videoconference. The camera 121 of the second body 205 may have high pixels because images of general subjects that are photographed are not sent immediately.

A flash 250 and a mirror 255 may be additionally disposed adjacent to the camera 121 of the second body 205. The flash 250 radiates a subject when the subject is photographed using the camera 121 of the second body 205. A user can see his face, etc. on the mirror 255 when the user has his face, etc. taken using the camera 121 of the second body 205.

The sound output module 152 may be further disposed in the second rear case 235.

The sound output module 152 of the second body 205 can implement a stereo function together with the sound output module 152 of the first body 200 and can also be used as a speakerphone mode for a call.

Further, an antenna 260 for receiving broadcasting signals as well as an antenna for a call, etc. may be disposed on one side of the second rear case 235. The antenna 260 may be installed so that it can be drawn from the second body 205.

One part of a slide module 265 for slidably coupling the first body 200 and the second body 205 is disposed on the part of the first rear case 225 of the first body 200.

The other part of the slide module 265 may be disposed on the part of the second front case 230 of the second body 205 so that it is not exposed to the outside as shown in this drawings.

It has been described above that the camera 121 and the like are disposed in the second body 205, but this document is not limited the above configuration.

For example, at least one of the constituent elements, which have been described to be disposed in the second rear case 235, such as the camera 121 of the second body 205, may be disposed in the first body 200, mainly, the first rear case 225. In this case, there is an advantage in that constituents elements disposed in the first rear case 225 can be protected by the second body 205 in the closed configuration. Further, although the camera 121 of the second body 205 is not separately included, the camera 121 of the first body 200 can be rotatably and disposed, so it can photograph even the photographing direction of the camera 121 of the second body 205.

The communication device 100 shown in FIGS. 9 to 11 may comprise a wired/wireless communication system and a satellite-based communication system in such a manner that it can be operable in a communication system which is able to transmit data via frames or packets.

A wireless communication system in which the communication device pertinent an embodiment of this document can be operated is described below with reference to FIG. 12.

A communication system may employ different wireless interface and/or physical layers. For example, wireless interfaces that are available to the communication system may comprise FDMA (Frequency Division Multiple Access), TDMA (Time Division Multiple Access), CDMA (Code Division Multiple Access), UTMS (Universal Mobile Telecommunications Systems) (in particular, LTE (Long Term Evolution), GSM (Global System for Mobile Communications), and the like. Hereinafter, for convenience of description, CDMA will be described as an example. However, it is to be understood that this document may also be applied to the entire communication system as well as the CDMA system.

Figure 12:
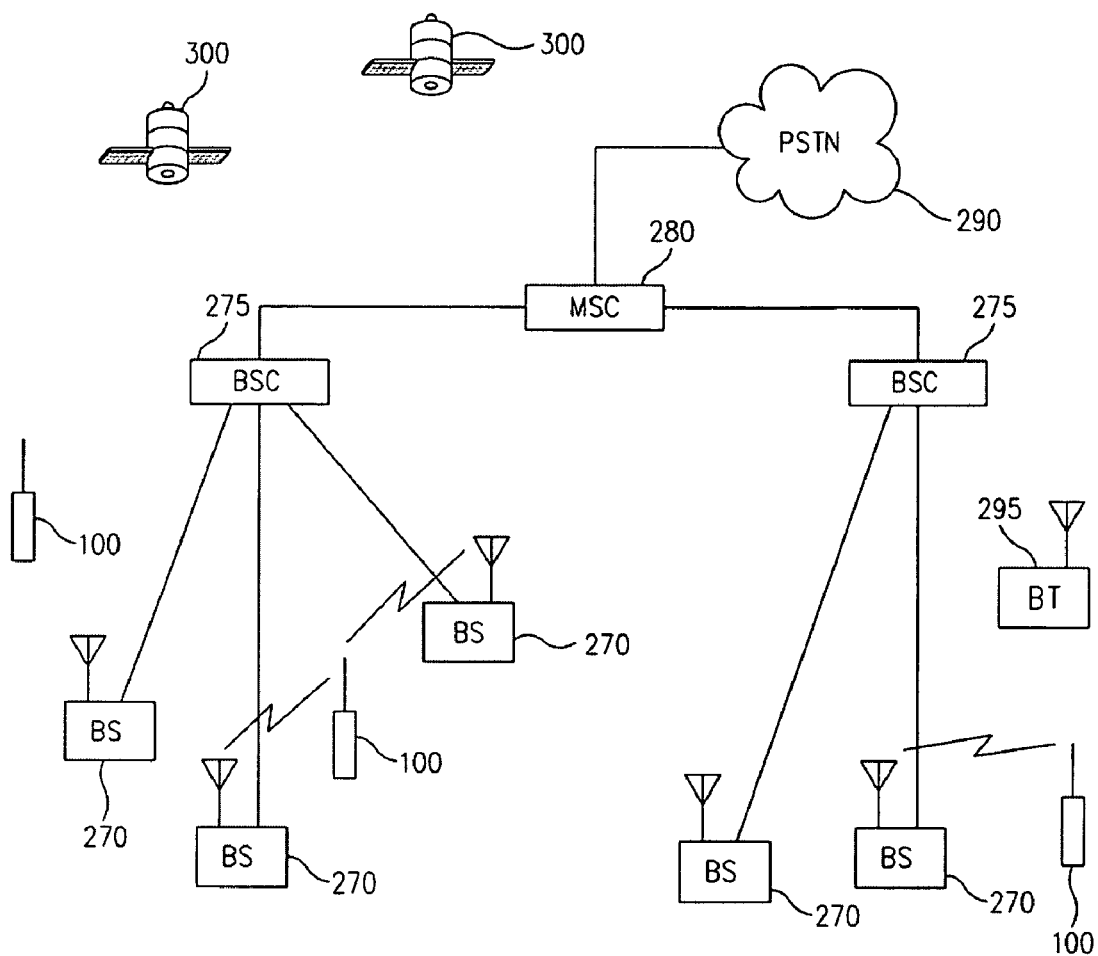
FIG. 12 is a block diagram of a CDMA wireless system in which the communication device shown in FIGS. 9 to 11 can be operated.

As shown in FIG. 12, the CDMA wireless communication system may comprise a plurality of the communication devices 100, a plurality of base stations (BS) 270, BSCs (Base Station Controllers) 275, and a MSC (Mobile Switching Center) 280. The MSC 280 is connected to a PSTN (Public Switched Telephone Network) 290 and is also connected to the BSCs 275. The BSCs 275 may be connected to the BS 270 in pairs through a backhaul line. The backhaul line may be included according to at least one of E1/T1, ATM, IP, PPP, Frame Relay, HDSL, ADSL, and xDSL. Thus, the plurality of BSCs 275 may be included in the system shown in FIG. 4.

Each BS 270 may comprise at least one sector, and each sector may comprise an antenna orienting toward to a specific radial direction from an omni-directional antenna or the BS 270. Further, each sector may comprise two or more antennas of various forms. Each BS 270 may be configured to support a plurality of frequency assignments and each of the plurality of frequency assignments has a specific spectrum (for example, 1.25 MHz, 5 MHz or the like).

Crossing of the sector and frequency assignment may be called a CDMA channel. The BS 270 may also be called a BTS (Base Station Transceiver Subsystem). Here, the term "base station (BS)" may refer to a meaning in which one BSC 275 and at least one BS 270 are incorporated. The BS may also represent a "cell site". Alternatively, each of the plurality of sectors with respect to a specific BS 270 may also be called a plurality of cell sites.

As shown in FIG. 12, a BT (Broadcasting Transmitter) 295 transmits broadcasting signals to the communication device 100 operating within the system. The broadcasting receiving module 111 shown in FIG. 9 is provided within the communication device 100 in order to receive broadcasting signals transmitted from the BT 295.

There are also shown in FIG. 12 several GPS (Global Positioning System) satellites 300. The satellites 300 help locate the position of at least one of the plurality of communication devices 100. Although two satellites are shown in FIG. 4, useful position information can be obtained by two or less or more satellites. The position information module 115 shown in FIG. 9 cooperates with the satellites 300 so as to acquire desired positional information. Here, positions can be tracked using not only GPS tracking technology, but also all technologies that are able to track positions. Further, at least one of the GPS satellites 300 can be responsible for satellite DMB transmission selectively or additionally.

As typical operations of the wireless communication system, the BS 270 receives reverse link signals from various communication devices 100. Here, the communication devices 100 may operate to connect a call, transmit/receive messages or perform other communication operations. Each of the reverse link signals received by specific BSs 270 is processed therein by specific BSs 270. Data, generated as a result of the processing, is sent to the BSC 275 connected to the BS 270. The BSC 275 provides functions, such as call resource assignment and mobile management, including organization of soft handoffs between the BSs 270. Further, the BSC 275 transmits the received data to the MSC 280 and the MSC 280 provides additional transmission services for the purpose of connection to the PSTN 290. Similarly, the PSTN 290 is connected to the MSC 280, the MSC 280 is connected to the BSCs 275, and the BSCs 275 control the BSs 270 so that they can transmit forward link signals to the communication devices 100.

Figure 13:
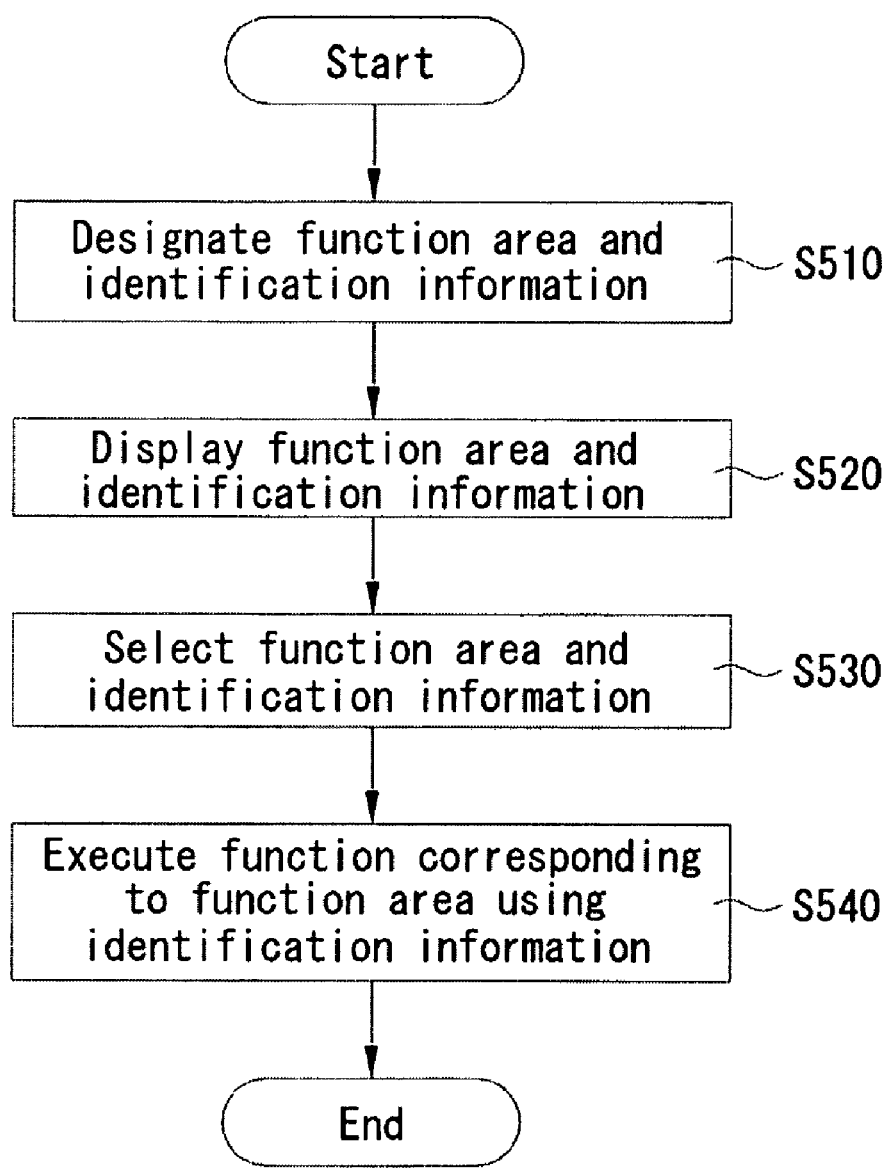
FIG. 13 is a flowchart illustrating a function execution method of the communication device related to an embodiment of this document.

Hereinafter, a function execution method of the communication device in accordance with this document is described step by step with reference to FIG. 13. FIG. 13 is a flowchart illustrating a function execution method of the communication device related to an embodiment of this document. For convenience of description, it is assumed that the communication device mentioned in relation to FIG. 13 comprises the constituent elements shown in FIG. 9.

Referring to FIG. 13, the communication device 100 specifies at least one function area and/or at least one identification information, which will be displayed in a display step (S520) to be described later on, in step S510.

Here, the identification information is information unique to a specific counterpart and refers to information for identifying a specific counterpart. For example, the identification information may comprise at least one of a telephone number, an e-mail address, a messenger ID, a homepage address, an identification name set in at least one of a telephone number, an e-mail address, a messenger ID, and a homepage address, and an image corresponding to an identification name. Of course, the identification information may comprise all information that is able to identify a specific counterpart, including the above examples.

Further, the function area refers to an area in which functions, which can be executed in association with the identification information, are set. Thus, activation of the function area may refer to an execution command input with respect to a function corresponding to the function area. For example, in the function area may be set at least one of a call related function, a message related function, an e-mail related function, an instant messaging service related function, a navigation related function, a homepage access related function, and an information search related function.

Information related to the identification information and the function area may be stored in the memory 160.

In the designation step (S510), the communication device 100 can designate function areas or identification information, which is selected by a user or designate function areas or identification information, which is designated by default by the communication device 100. Alternatively, in the designation step (S510), the communication device 100 may store a plurality of designation modes, and designate function areas or identification information according to one of the plurality of designation modes, which is selected by a user.

The designation step (S510) is described in detail below with reference to FIGS. 14A to 4C.

FIG. 14A shows a screen configuration of a process of designating function areas in the communication device 100.

As shown in (a) of FIG. 14A, the communication device 100 can display a list of a plurality of functions (hereinafter, referred to as a "function list"), which can be assigned to the function area, on a screen and assign at least one function selected from the displayed function list to each function area. For example, the function list may be comprised of a call related function, a message related function, an e-mail related function, an instant messaging service related function (IM), a navigation related function, a homepage access related function, and so on.

Further, as shown (b) of FIG. 14A, the communication device 100 can display a function list, which can be assigned to the function area, on a screen. At this time, in the case of a function having subordinate functions, a list of subordinate functions (hereinafter, referred to as a "subordinate function list") can be displayed together with a corresponding function. Thus, a user can select a desired one of subordinate functions belonging to a specific function. For example, when a function is a message related function, the subordinate function list may comprise message write, inbox, outbox, a multi-media, and so on.

In particular, in FIG. 14A, each of function and/or subordinate functions constituting a list can be displayed together with a check box to indicate whether the function will be selected. Further, selected functions and/or subordinate functions may be displayed distinctly from unselected functions and/or subordinate functions.

FIG. 14B shows a screen configuration of a process of designating identification information in the communication device 100.

As shown in (a) of FIG. 14B, the communication device 100 can display plural pieces of identification information, in particular, a list comprised of names on a screen and designate a name selected from the displayed list. Here, the name may refer to a name set in information for identifying a counterpart, such as a telephone number, an e-mail address, and a messenger ID.

Further, as shown in (b) of FIG. 14B, when a specific name is selected from the name list, the communication device 100 can display a list of identification information set with respect to the selected specific name and designate selected identification information of the displayed identification information. Here, the identification information may comprise a telephone number, an e-mail address, a messenger ID, a homepage address, an image, and so on, which are set in the specific name.

In particular, in FIG. 14B, each of the identification information constituting the list can be displayed together with a check box to indicate whether the identification information will be selected. Further, selected identification information may be displayed distinctly from unselected identification information.

Figure 14C:
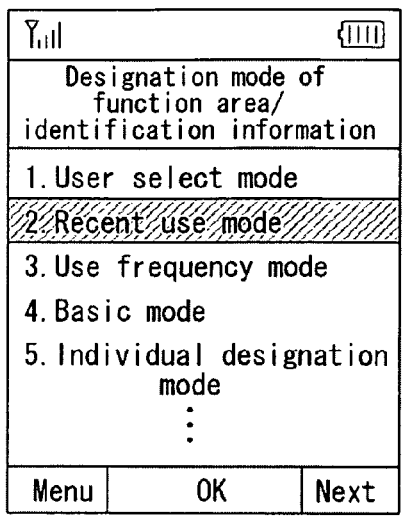
Figure 14C:
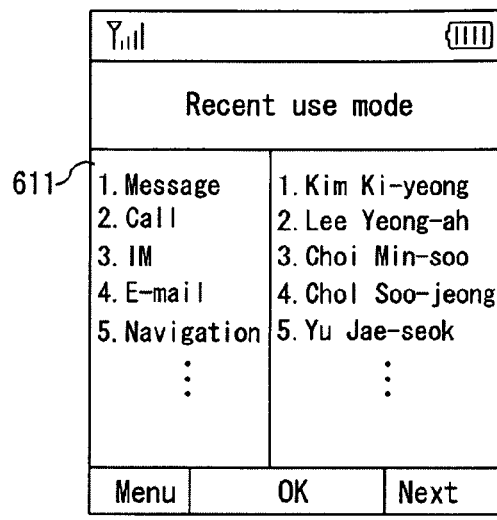

FIG. 14C shows a screen configuration of a process of designating function areas and/or identification information according to a designation mode in the communication device 100.

As shown in (a) of FIG. 14C, the communication device 100 displays a list of modes (hereinafter, referred to as a "mode list") for designating function areas and/or identification information. Here, the mode list may comprise a user-selected mode, a recent use mode, a use frequency mode, a basic mode, an individual designation mode and the like. For example, the user-selected mode refers to a mode in which function areas and/or identification information selected by a user are/is designated, the recent use mode refers to a mode in which function areas and/or identification information are/is designated according to a recent use sequence, the use frequency mode refers to a mode in which function areas and/or identification information are/is designated according to a higher priority of frequency, the basic mode refers to a mode in which function areas and/or identification information, which are/or selected by default by the communication device 100, are/is designated, and the individual designation mode refers to a mode in which function areas and identification information are/is designated individually. In particular, when the individual designation mode is selected, the communication device 100 can designate any one of the above modes with respect to each of function areas and identification information.

As shown in (b) of FIG. 14C, when the "'recent use mode" is selected from the mode list, the communication device 100 can display a list of functions and a list of identification information (in particular, names), which can be assigned to the function area, according to a recent use sequence. Here, a user can select a specific function or identification information from the displayed function list or identification information list.

Referring back to FIG. 13, the communication device 100 displays at least one function area and/or at least one identification information designated in the designation step (S510) in step S520. When function areas and/or identification information that are/is separately designated do/does not exist, the communication device 100 can display function areas to which the entire functions, which can be performed using identification information stored in the memory 160, are assigned, respectively, and/or the entire identification information stored in the memory 160.

The display step (S520) can be executed when a "function execution mode employing identification information" is selected by a user through the user input unit 130. Here, the "function execution mode employing identification information" refers to a mode in which a function corresponding to a selected function area of a plurality of function areas is executed by employing identification information selected from an identification information list.

In the display step (S520), the communication device 100 can display at least one function area and/or at least one identification information by employing at least one of a text, an icon, a symbol, and an image.

The display step (S520) is described in detail below with reference to FIGS. 15A to 18.

Figure 15A:
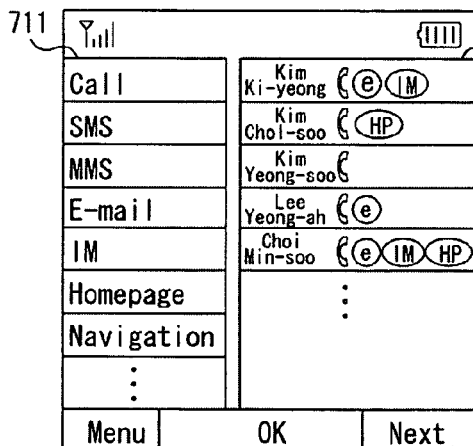
Figure 15A:
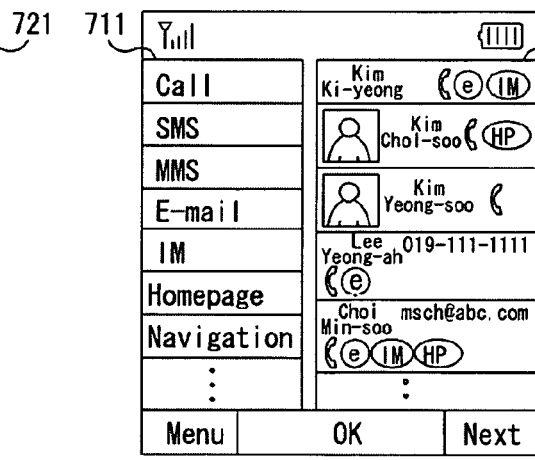

FIGS. 15A to 15C show first screen configurations displaying function areas and identification information in the communication device 100.

A general display process is described below with reference to FIG. 15A.

First, as shown in FIG. 15A, the communication device 100 can display a plurality of function areas 711 in which a plurality of functions are respectively set in a first area of a screen and displays plural pieces of identification information 721 and 722 in a second area of the screen.

In particular, as shown in (a) of FIG. 15A, the communication device 100 can display a plurality of names and a mark, indicating identification information (for example, a telephone number, an e-mail address, a messenger ID, a homepage address, etc.) respectively set in the plurality of names, together in displaying identification information.

Alternatively, as shown in (b) of FIG. 15A, the communication device 100 can display a plurality of names and a mark, indicating representative identification information of plural pieces of identification information respectively set in the plurality of names, together in displaying identification information. Here, the representative identification information may become at least one of a name, an image corresponding to the name, a telephone number, an e-mail address, and a homepage address.

Hereinafter, a display process according to the recent use sequence is described below with reference to FIG. 15B. In particular, when the "recent use mode" is selected in (a) of FIG. 14C, the display process shown in FIG. 15B can be performed.

As shown in FIG. 15B, the communication device 100 displays a plurality of function areas 711 in which a plurality of functions are respectively set in a first area of a screen, and displays plural pieces of identification information 723 in a second area of the screen according to a recent use sequence. Here, the identification information 723 may be identification information, which was previously stored by a user or identification information having a history that has been used to perform a function corresponding to the function area.

Although not shown in FIG. 15B, displayed function areas can be listed according to a recent use sequence of a function corresponding to the function area.

A display process according to the use frequency is described below with reference to FIG. 15C. In particular, when the "use frequency mode" is selected in (a) of FIG. 14C, the display process shown in FIG. 15C may be performed.

As shown in FIG. 15C, the communication device 100 displays a plurality of function areas 711 in which a plurality of functions are respectively set in a first area of a screen, and displays plural pieces of identification information 724 in a second area of the screen according to the use frequency. Here, the identification information 724 may be identification information, which was previously stored by a user or identification information having a history that has been used to perform a function corresponding to the function area. For example, a number used can also be displayed in each identification information.

Although not shown in FIG. 15C, displayed function areas can be listed according to the use frequency of a function corresponding to the function area.

Figure 16A:
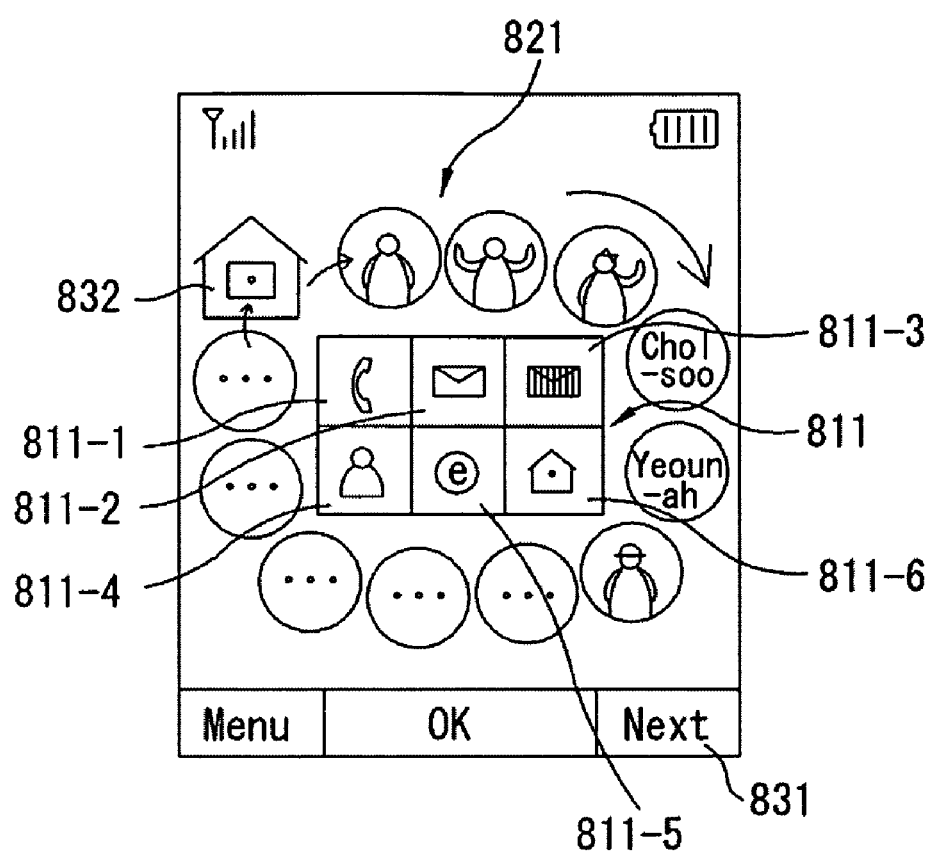
FIGS. 16A and 16B show second screen configurations displaying a function area and identification information in the communication device related to an embodiment of this document.
Figure 16B:
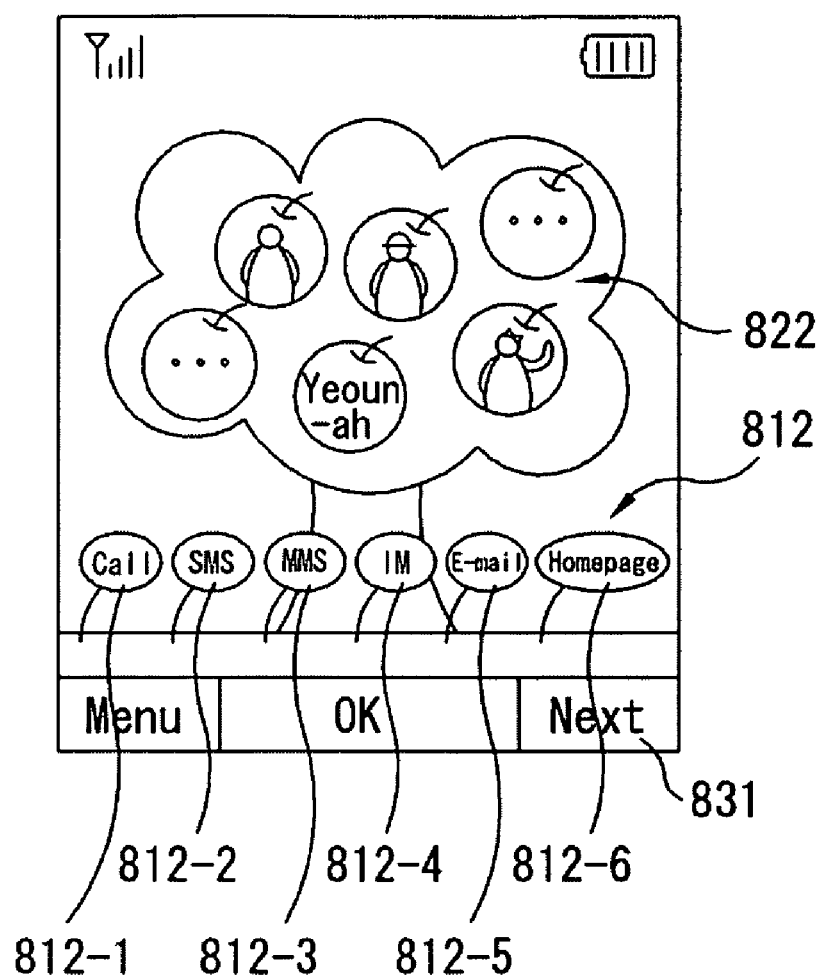

FIGS. 16A and 16B show second screen configurations displaying function areas and identification information in the communication device 100.

First, as shown in FIG. 16A, the communication device 100 can display function areas 811-1 to 811-6 (hereinafter, referred to as "811") in which a call related function, a text message related function, a multi-message related function, an instant messenger service related function, an e-mail function, and a homepage access related function are respectively set in a first area (in particular, a center area) of a screen. Here, an icon to indicate a corresponding function can be displayed in each function area.

Further, the communication device 100 can display plural pieces of identification information areas 821 surrounding the first area, and display corresponding identification information on each identification information area. Here, a name set in a telephone number, etc., an image corresponding to the name, and so on can be displayed in the identification information area.

For example, when the number of identification information that can be displayed on one screen is limited to 10, 10 pieces of identification information having a next priority can be displayed according to manipulation of a user (for example, select an area "Next" 831) or after a lapse of a specific time. Alternatively, the identification information areas can be sequentially output beginning a house icon 832 and can be moved in a constant direction (for example, a clockwise direction) and at a constant rate. Of course, the communication device 100 can control the output direction and speed according to key manipulation or touch manipulation of a user (in the case of a touch screen). In particular, in the case where the communication device 100 is equipped with a touch screen, when the touch screen is touched and dragged in a direction opposite to an output direction, the output direction may change to the opposite direction, and when the touch screen is touched and dragged by a specific distance or greater in the output direction, the output speed may be increased or identification information, which is located at a specific next priority of identification information that is now being output, may be output.

Next, as shown in FIG. 16B, the communication device 100 displays function areas 812-1 to 812-6 (hereinafter, referred to as "812") in which a call related function, a text message related function, a multi-message related function, an instant messenger service related function, an e-mail function, and a homepage access related function are respectively set in a first area of a screen (in particular, a lower area). Here, each function area can be displayed as a tree form where a corresponding function is displayed.

Further, the communication device 100 can display plural pieces of identification information areas in a form where fruits are borne in one tree. Here, in the identification information areas can be displayed a name set in a telephone number, etc., an image corresponding to the name and the like.

For example, when the number of identification information that can be displayed on one screen is limited to 10, the communication device 100 can display a form in which fruits corresponding to 10 pieces of identification information drop below the screen and fruits corresponding to 10 pieces of identification information having a next priority are borne according to manipulation of a user (for example, select an area "Next" 831) or after a lapse of a specific time.

Although not shown in the drawings, when the communication device 100 is equipped with a touch screen, the communication device 100 can change a display location of the function areas and/or the identification information according to the touch and drag operation of a user. For example, when the touch screen is touched and dragged from one point of a first function area (or a first identification information area) to one point of a second function area (or a second identification information area), the first and second function areas (or the identification information areas) may have their positions exchanged and then displayed.

Further, although not shown in the drawings, when the communication device 100 is equipped with a touch screen, the communication device 100 may not further display a specific function area or identification information when the touch screen is touched and dragged from one point of a specific function area or an identification information area to one point outside a corresponding region.

FIGS. 17A to 17F show third screen configurations displaying a function region and identification information in the communication device 100.

A process of displaying identification information corresponding to search conditions is described below with reference to FIGS. 17A to 17F.

The communication device 100 according to this document can receive at least one search condition through the user input unit 130 and display identification information pertinent to the input search condition through the display unit 151. Here, the search condition may comprise a function corresponding to a specific function area, a group comprising at least one identification information, a use frequency, a recent use sequence, texts constituting identification information and the like.

Figure 17A:
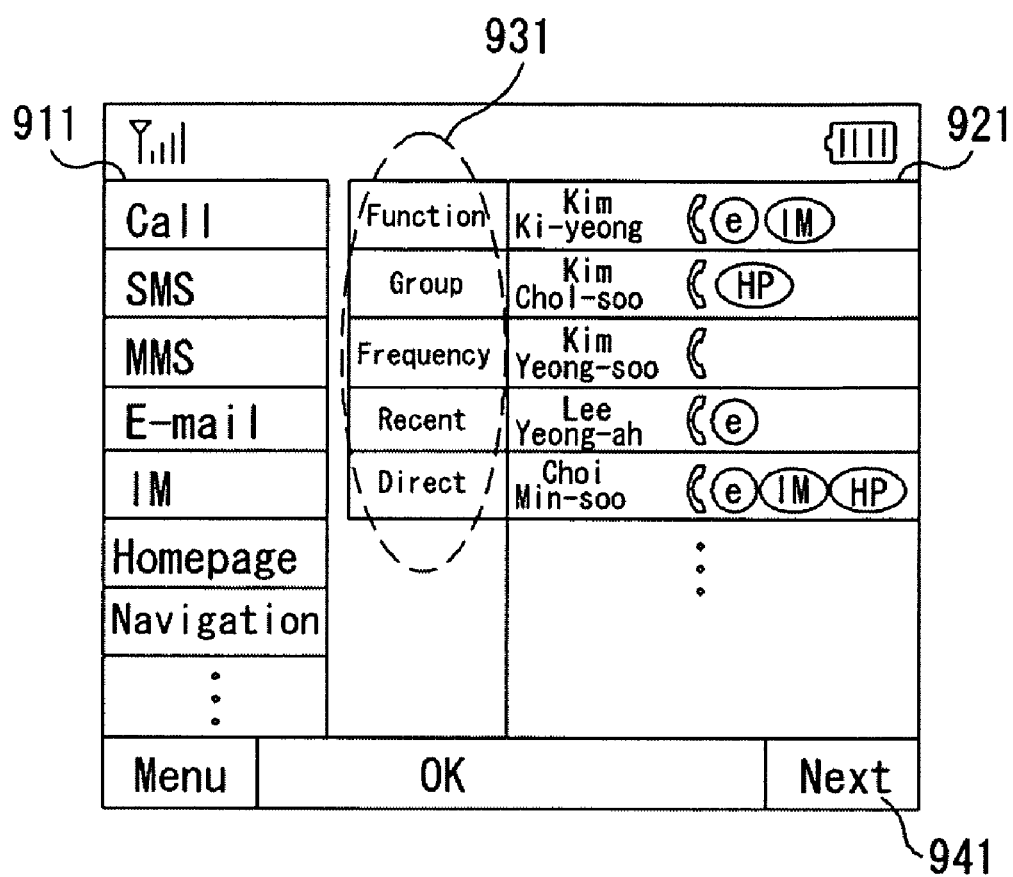

First, as shown in FIG. 17A, the communication device 100 displays a plurality of function areas 911 in a first area of a screen, plural pieces of identification information 921 in a second area of the screen, and search conditions 931 for searching plural pieces of identification information in a third area of the screen. For example, the search conditions 931 can be displayed in a tag form.

Figure 17B:
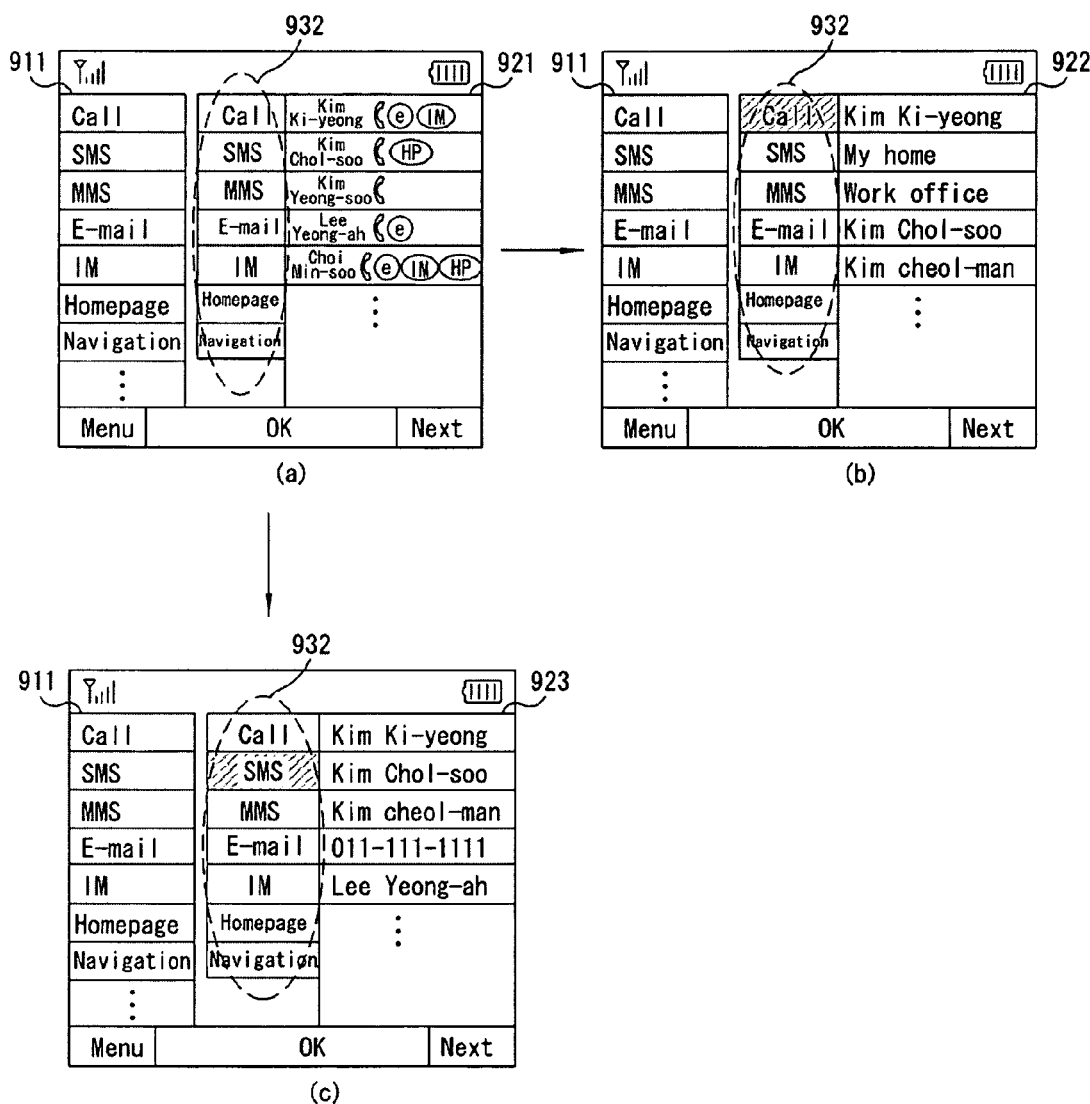

When 'Function' of the search conditions 931 is selected, the communication device 100 can display a screen shown in FIG. 17B.

As shown in (a) of FIG. 17B, when the 'Function' of the search conditions is selected, the communication device 100 can display functions corresponding to a plurality of function areas in the third area.

When 'Call' of the displayed functions is selected, the communication device 100 can display 'telephone numbers' or 'names and/or images in which telephone numbers are set' (that is, identification information necessary for call transmission) in the second area (b).

Further, when 'SMS' of the displayed functions is selected, the communication device 100 can display 'telephone numbers' or 'names and/or images in which telephone numbers are set' (that is, identification information necessary for text message transmission) in the second area (c).

Although not shown in the drawings, the communication device 100 can display 'telephone numbers' or 'names and/or images in which telephone numbers are set' (that is, identification information necessary for multi-message transmission) when 'MMS' of the displayed functions is selected, display 'e-mail address' or 'names and/or images in which e-mail addresses are set' (that is, identification information necessary for e-mail transmission) when 'E-mail' of the displayed functions is selected, display 'messenger IDs' or 'names and/or images in which messenger IDs are set' (that is, identification information necessary to perform instant messenger service) when 'M' of the displayed functions is selected, and display 'homepage addresses' or 'names and/or images in which homepage addresses are set' (that is, identification information necessary to access homepages) when 'homepage access' of the displayed functions is selected.

Further, although not shown in the drawings, when a specific function area of the function areas 911 shown in the first area is selected, the communication device 100 may search identification information, which is necessary to perform a function corresponding to the selected specific function area, and display searched identification information.

Figure 17C:
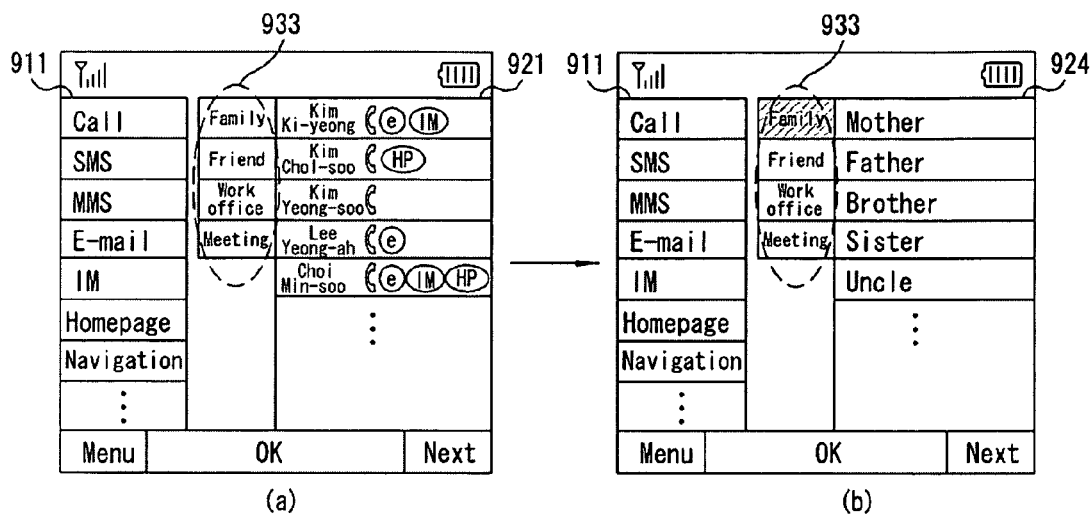

Alternatively, when 'Group' of the search conditions 931 is selected, the communication device 100 can display a screen shown in FIG. 17C.

As shown in (a) of FIG. 17C, when 'Group' of the search conditions 931 is selected, the communication device 100 can display groups to which at least one identification information belongs in the third area.

When 'Family' of the displayed groups is selected, the communication device 100 can display identification information (in particular, names and/or images set in a telephone number, etc.), which belongs to the group 'Family' (b).

Although not shown in the drawings, the communication device 100 may display identification information belonging to a group 'Friend' when 'Friend' of the displayed groups is selected, display identification information belonging to a group 'Work place' when 'Work place' of the displayed groups is selected, and display identification information belonging to a group 'Meeting' when 'Meeting' of the displayed groups is selected.

Figure 17D:
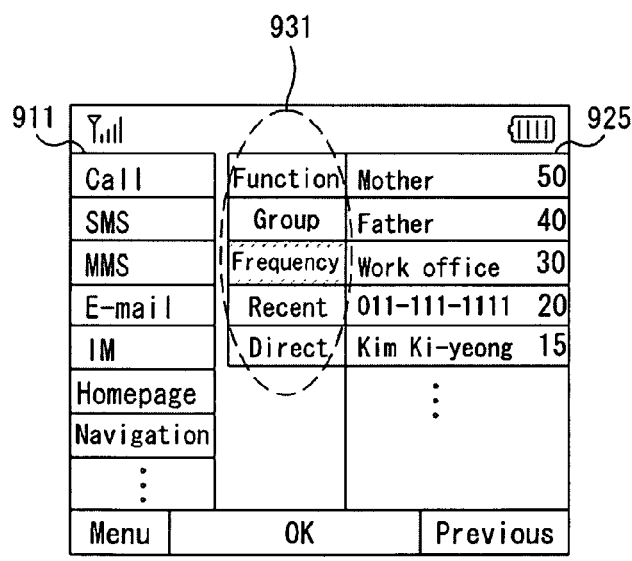

Alternatively, when 'Frequency' of the search conditions 931 is selected, the communication device 100 may display a screen shown in FIG. 17D.

As 'Frequency' of the search conditions 931 is selected as shown in FIG. 17D, the communication device 100 can display plural pieces of identification information having a higher use frequency in the third area.

Figures 17E, 17F:
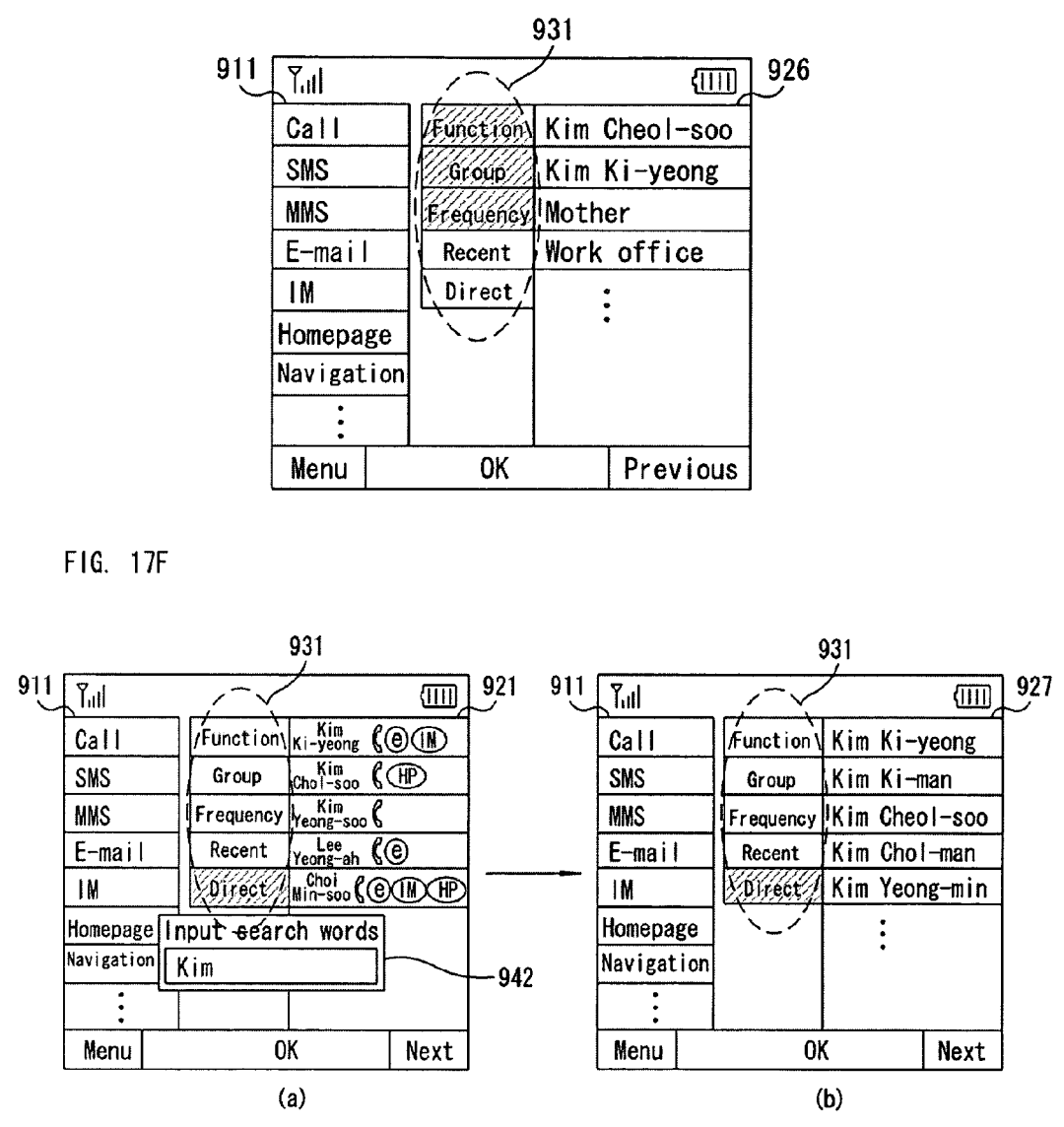

Alternatively, when 'Recent' of the search conditions 931 is selected, the communication device 100 can display a screen shown in FIG. 17E.

As 'Recent' of the search conditions 931 is selected as shown in FIG. 17E, the communication device 100 can display plural pieces of identification information having a recent use sequence in the third area.

Alternatively, when 'Direct' of the search conditions 931 is selected, the communication device 100 can display a screen shown in FIG. 17F.

As 'Direct' of the search conditions 931 is selected as shown in FIG. 17F, the communication device 100 displays a search condition input window 942 on the screen and displays search conditions, which are input by a user through the user input unit 130, on the search condition input window 942.

When the input search condition is 'Kim' in (a) of FIG. 17F, the communication device 100 can search identification information, including names having 'Kim', and display searched information in the second area (b).

Although not shown in the drawings, when the input search condition is '011' or 'naver' in (a) of FIG. 17F, the communication device 100 can search identification information, including telephone numbers having '011', or identification information, including e-mail addresses or messenger IDs having 'naver', and display searched information in the second area.

Here, in FIGS. 17B to 17F, the communication device 100 can display only identification information corresponding to search conditions. However, the communication device 100 may display the entire identification information, but only identification information corresponding to search conditions may be displayed so that it can be identified.

Figure 18:
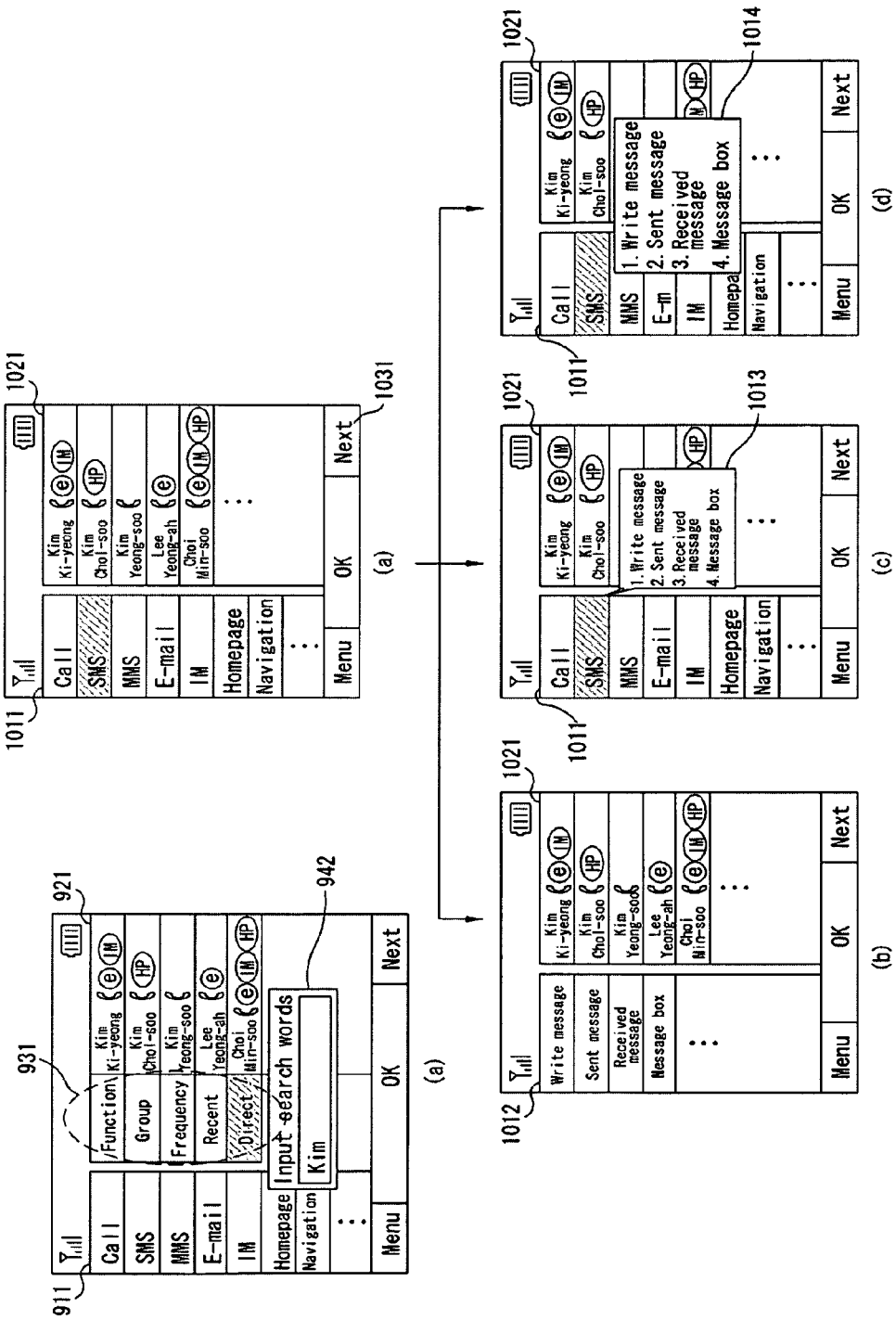
FIG. 18 shows a fourth screen configuration displaying a function area and identification information in the communication device related to an embodiment of this document.

FIG. 18 shows a fourth screen configuration displaying function areas and identification information in the communication device 100.

A case where a plurality of subordinate functions belongs to a function corresponding to the function area is described below with reference to FIG. 18. For convenience of description, a text message related function, as a function to which a plurality of subordinate functions belongs, is described as an example.

As in (a) of FIG. 18, in the communication device 100, an area 'SMS' in which a text message related function, of function areas 1011 displayed in a first area of a screen, is selected.

Meanwhile, when the area 'SMS' is selected by a user, the communication device 100 determines whether a plurality of subordinate functions belonging to the text message related function will be displayed or whether a specific one of a plurality of subordinate functions belonging to the text message related function will be selected immediately. Here, the communication device 100 may decide to perform an operation selected by a user (the operation can be performed before or after the area 'SMS' is selected).

Alternatively, when the communication device 100 is equipped with a touch screen, the communication device 100 may perform the decision operation according to a touch method of the area 'SMS'. For example, the communication device 100 can perform the decision operation at least one of a touch time, a touch pressure, a touch area, a touch number, a touch and drag distance, a touch and drag speed, and a touch and drag direction.

Hereinafter, description is given on the assumption that the communication device 100 has decided to display a plurality of subordinate functions belonging to the text message related function.

The communication device 100 can display a plurality of subordinate functions in the text message related function corresponding to the selected area 'SMS' in various ways (b, c, d). Here, the subordinate functions may comprise a message write, a sent message, a received message, a message box and the like.

First, as in (b) of FIG. 18, the communication device 100 can display function areas in which a plurality of subordinate functions belonging to a text message related function is respectively set in a first area. Here, in the state (a) of FIG. 18, the display of the function areas displayed in the first area is stopped.

Alternatively, as in (c) of FIG. 18, the communication device 100 can display a plurality of subordinate functions belonging to a text message related function in a speech bubble form corresponding to the area 'SMS'.

Alternatively, as in (d) of FIG. 18, the communication device 100 may display a plurality of subordinate functions belonging to a text message related function in a pop-up window 1014. Here, the pop-up window 1014 may disappear from the screen after a lapse of a specific time according to setting.

Referring back to FIG. 13, in the communication device 100, a function area and/or identification information are/or selected from at least one function area and/or at least one identification information displayed in the display step (S520) in S530.

In the selection step (S530), a user may select a plurality of function areas and/or plural pieces of identification information.

Further, the communication device 100 can display the function areas and/or the identification information, which are selected in the selection step (S530), in various ways so that they are distinct from one another. For example, the communication device 100 may display the function areas and/or the identification information by employing a highlight, a color, a font, a display size, and so on.

Further, the communication device 100 can select any one of the function areas and the identification information in the selection step (S530). That is, the function areas and the identification information may be sequentially selected according to the selection of a user or the setting of the communication device 100.

Further, the selection step (S530) may be performed according to a selection signal, which is input through a numeric key, a direction key, a side key or the like provided in the user input unit 130. Alternatively, the selection step (S530) may be performed according to a user's touch operation with respect to the touch screen.

Figure 19A:
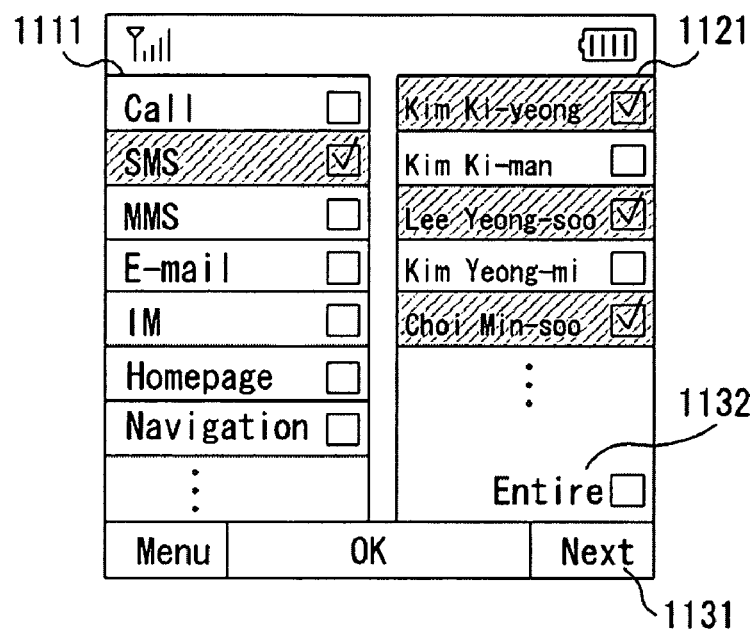
FIGS. 19A to 19C show screen configurations of a process of selecting a function area and identification information in the communication device related to an embodiment of this document.
Figure 19B:
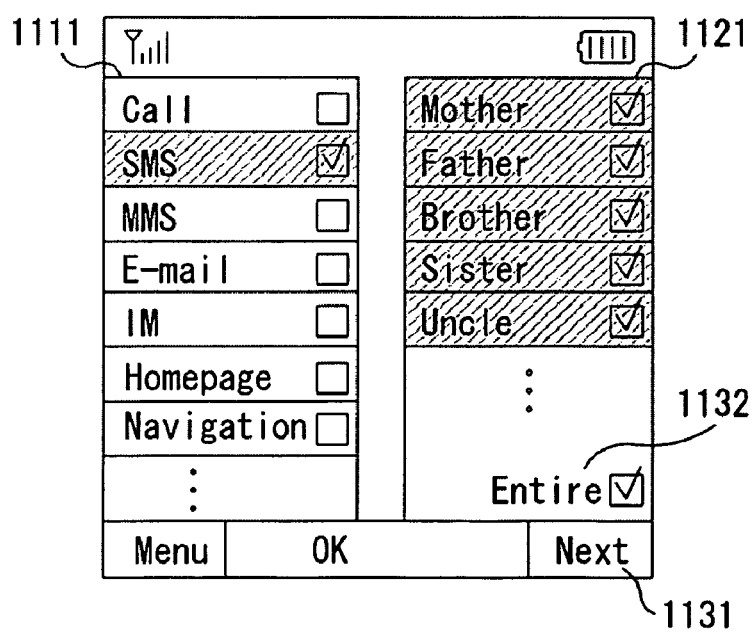
Figure 19C:
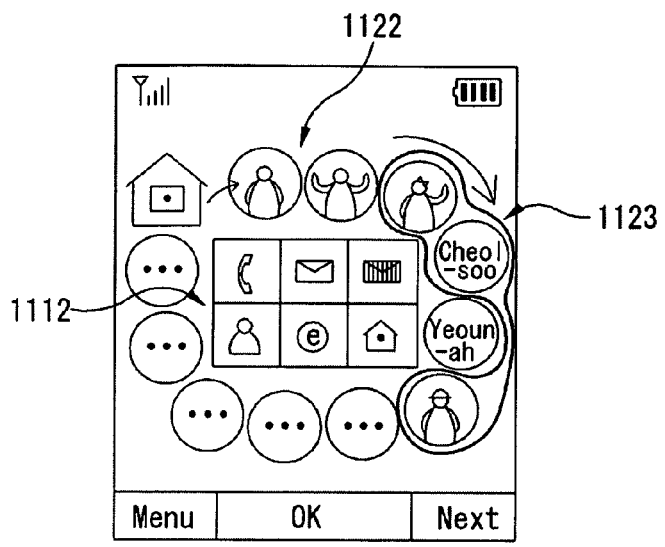

The selection step (S530) is described below in detail with reference to FIGS. 19A to 19C. FIGS. 19A to 19C show screen configurations of a process of selecting function areas and identification information in the communication device 100.

When a specific function area and/or specific identification information is selected by a user as in FIG. 19A, the communication device 100 checks check boxes respectively corresponding to the function area and/or the specific identification information in order to inform that the function area and/or the identification information have/has been selected.

When 'Entire' 1132 provided in a second area where identification information 1121 is displayed is selected by a user as shown in FIG. 19B, the communication device 100 can select the entire identification information displayed on a current screen. Alternatively, when the 'Entire' 1132 is selected in a state where identification information belonging to a specific group is displayed, the communication device 100 may select the entire identification information belonging to the specific group.

Further, in the case where the communication device 100 is equipped with a touch screen as shown in FIG. 19C, when a function area and identification information are displayed as shown in FIG. 19A, a user can select the identification information included in a closed curve 1123 by drawing the closed curve 1123 comprising plural pieces of identification information. Here, even in FIG. 19C, desired identification information of the plural pieces of identification information may be selected individually.

The display step (S520) and the selection step (S530) are described in detail below with reference to FIGS. 20 to 21B.

Figure 20:
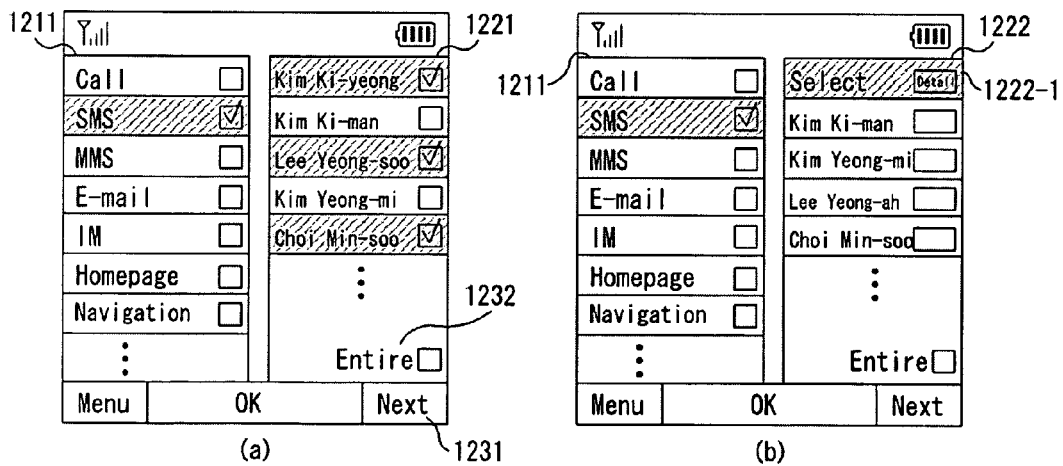
FIG. 20 shows a screen configuration of a process of displaying and selecting a function area and identification information when plural pieces of identification information are selected in the communication device related to an embodiment of this document.

FIG. 20 shows a screen configuration of a process of displaying and selecting a function area and identification information when plural pieces of identification information are selected in the communication device 100.

When plural pieces of identification information are selected (a), as shown in FIG. 20, the communication device 100 converts the plural pieces of identification information into one piece of new identification information 1222-1 and displays the one new identification information (b). At this time, identification information having a next priority can be displayed in spaces, which are created as the plural pieces of identification information are converted into the one piece of new identification information and the one piece of new identification information is displayed.

For example, the new identification information 1222-1 refers to the already selected identification information and, therefore, can be displayed as 'Select'. Further, when "Detail" is selected together with the new identification information 1222-1, the communication device 100 can display information about identification information included in the new identification information.

Although not shown in the drawings, when a plurality of function areas is selected, the communication device 100 can convert the plurality of selected function areas into one new function area and display the one new function area, and can also display function areas having a next priority in spaces, which are created as the plurality of selected function areas is converted into the one new function area and the one new function area is displayed.

Figure 21A:
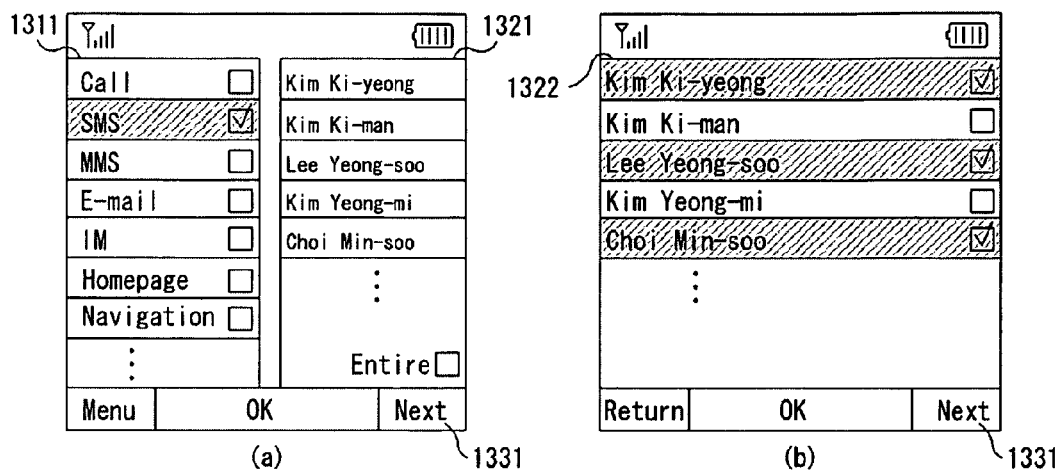
FIGS. 21A and 21B show screen configurations of a process of displaying and selecting a function area or identification information when any one of the function area and identification information is first selected in the communication device related to an embodiment of this document.
Figure 21B:
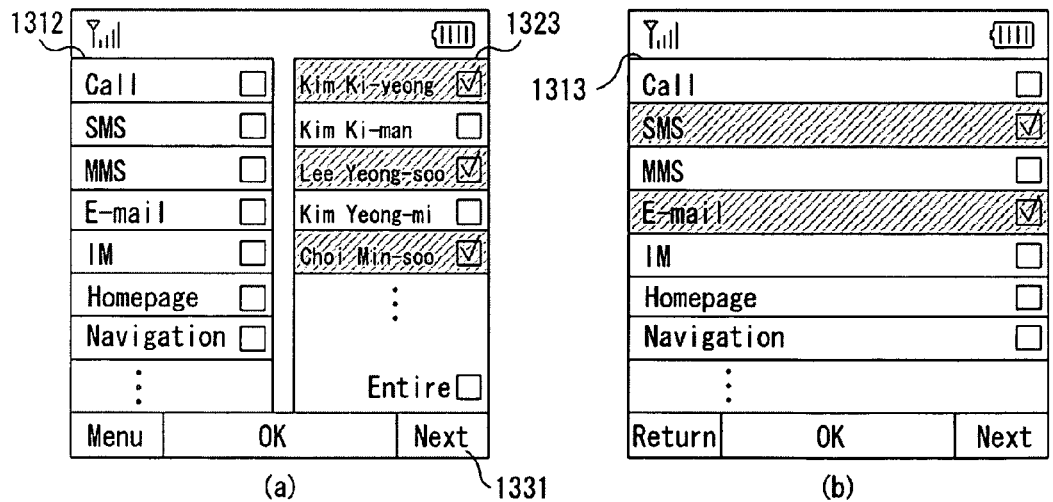

FIGS. 21A and 21B show screen configurations of a process of displaying and selecting a function area and/or identification information when any one of the function area and identification information is first selected in the communication device 100.

First, as shown in FIG. 21A, in the communication device 100, a specific function area (for example, the area 'SMS') of the function areas 1311 is selected (a). In this case, the communication device 100 determines whether the selection of the function area has been completed. For example, the communication device 100 may determine that the selection of the function area has been completed when at least one of a signal input (for example, activation of the area 'OK'), which informs that the function area has been selected after the function area is selected, a signal to inform that other function areas are not selected for a specific time since the function area is selected, and an input signal of a touch pattern designated in function area selection completion (when the communication device 100 is equipped with an input touch screen).

Further, if it is determined that the selection of the function area has been completed in (a) of FIG. 21A, the communication device 100 can display only plural pieces of identification information 1322 on a screen and receive selection of at least one identification information from the plural pieces of displayed identification information 1322 (b). This is for the purpose of increasing the utilization of the screen by not further displaying function areas that have already been selected.

Next, as in FIG. 21B, the communication device 100 receives at least one selected information of identification information 1323 (a). Here, the communication device 100 determines whether the selection of the identification information has been completed. For example, the communication device 100 may determine that the selection of the identification information has been completed when at least one of a signal input (for example, activation of the area 'OK'), which informs that the identification information has been selected after the identification information is selected, a signal to inform that other identification information is not selected for a specific time since the identification information is selected, and an input signal of a touch pattern designated in identification information selection completion (when the communication device 100 is equipped with an input touch screen).

Further, if it is determined that the selection of the identification information has been completed in (a) of FIG. 21B, the communication device 100 can display only a plural of functional areas 1313 on a screen and receive selection of at least one functional area from the plural pieces of displayed functional areas 1313 (b). This is for the purpose of increasing the utilization of the screen by not further displaying identification information that has already been selected.

Referring back to FIG. 13, the communication device 100 executes a function corresponding to a function area selected in the selection step (S530) by employing identification information selected in the selection step (S530) in step S540.

For example, when selected identification information is a 'telephone number' or a 'name and/or image where a telephone number is set', the communication device 100 can perform at least one of a function set in the selected function area (for example, a call transmission function, a message (including texts and/or multi-messages) transmission function, and a navigation function) by employing the selected identification information. Alternatively, when selected identification information is an 'e-mail address' or a 'name and/or image where an e-mail address is set', the communication device 100 may perform a function set in the selected function area (for example, an e-mail transmission function) by employing the selected identification information. Alternatively, when selected identification information is a 'messenger ID' or a 'name and/or image where a messenger ID is set', the communication device 100 may perform a function set in the selected function area (for example, an instant messenger service function) by employing the selected identification information. Alternatively, when selected identification information is a 'homepage address' or a 'name and/or image where a homepage address is set', the communication device 100 may perform a function set in the selected function area (for example, a homepage access function) by employing the selected identification information.

Meanwhile, when a function area where a function, which cannot be performed using the selected identification information, is set is selected, the communication device 100 can inform a user of the fact that the function cannot be performed and then returns to the selection step (S530).

Further, the execution step (S540) can be performed when a select completion signal with respect to a function area and identification information is input.

The execution step (S540) is described in detail below with reference to FIGS. 22A to 24B. Meanwhile, FIGS. 22A to 24B show cases where the communication device 100 is equipped with a touch screen.

Figure 22A:
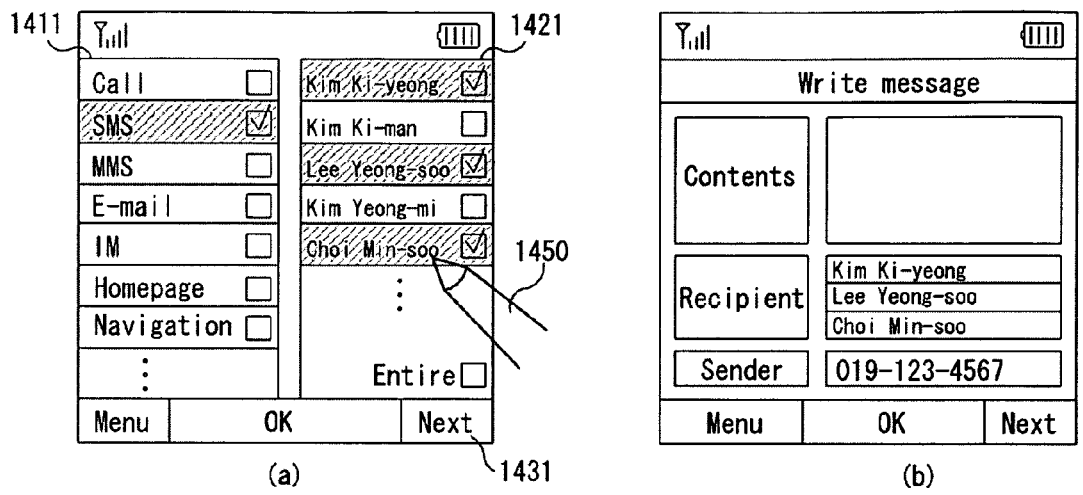
FIGS. 22A and 22B show first screen configurations of a process of executing a function corresponding to a function area by employing identification information in the communication device related to an embodiment of this document.
Figure 22B:
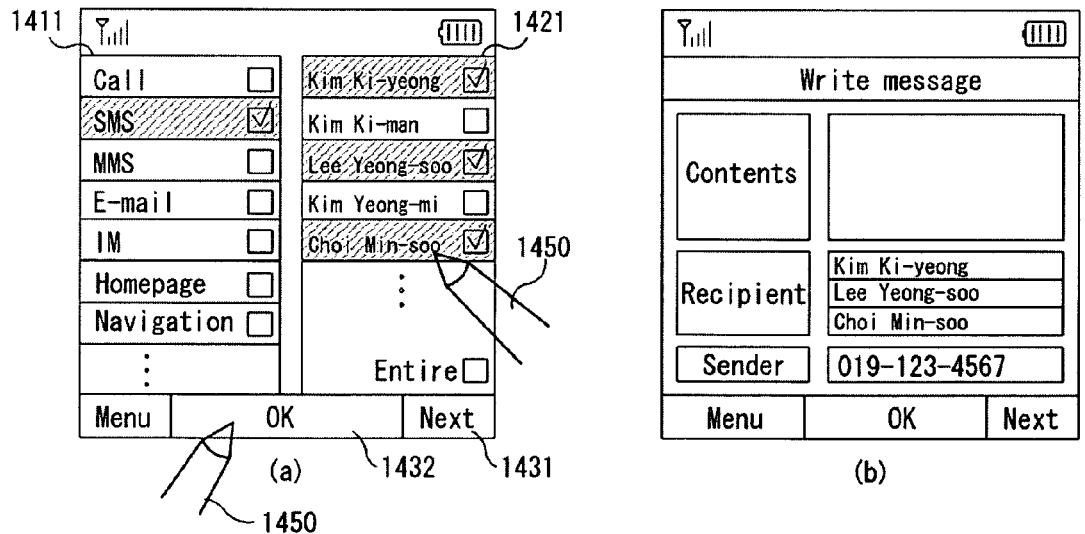

FIGS. 22A and 22B show screen configurations of a process of executing a function corresponding to a function area by employing identification information when a function area is first selected.

Referring to FIG. 22A or 22B, after the area 'SMS' of a plurality of function areas is selected, the communication device 100 can receive at least one identification information touched by a pointer 1450 (a).

Referring to FIG. 22A, the communication device 100 determines whether selection of identification information has been completed. In particular, the communication device 100 can determine that selection of identification information has been completed when the input of a touch pattern designated in identification information selection completion is sensed. For example, if a touch time, a touch number, a touch pressure, a touch area and the like satisfy the touch pattern designated in the identification information selection completion, the communication device 100 can determine that selection of identification information has been completed.

Referring to FIG. 22B, the communication device 100 determines whether selection of identification information has been completed. In particular, the communication device 100 can determine that selection of identification information has been completed when a signal input (for example, activation of the area 'OK'), informing that selection has been completed after the identification information is selected, is sensed. The communication device 100 may be equipped with an additional touch area for inputting selection completion of identification information.

Although not shown in the drawings, the communication device 100 may determine that selection of identification information has been completed when other identification information is not selected for a specific time since the identification information is selected.

If it is determined that the selection of the identification information has been completed in (a) of FIG. 22A or 22B, the communication device 100 sets a state where a message transmission function corresponding to the area 'SMS' can be performed based on the selected identification information (b). For example, the communication device 100 can enter a message write mode, receive the contents of a message, and designates the selected identification information as a message recipient. After the message write is completed, the communication device 100 can transmit the written message to a device corresponding to the selected identification information.

Figure 23A:
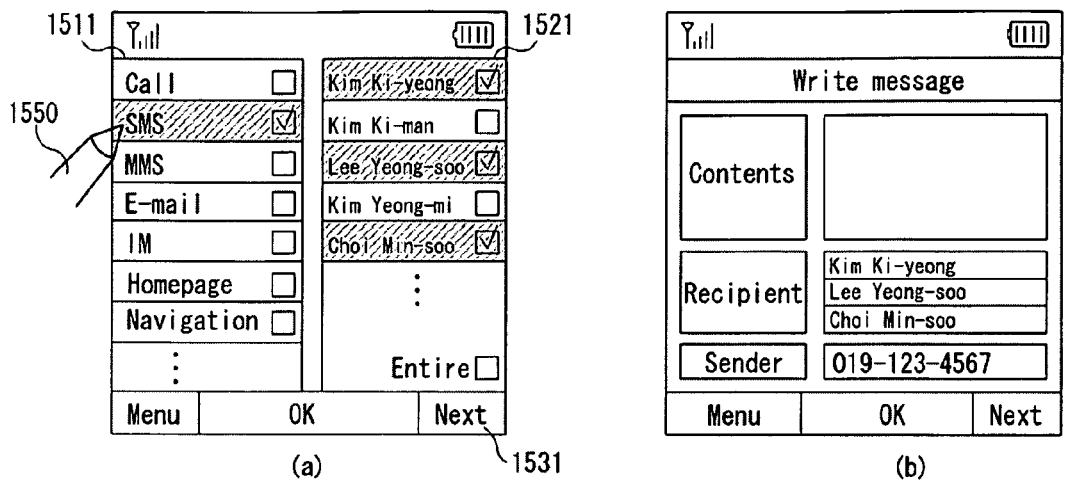
FIGS. 23A and 23B show second screen configurations of a process of executing a function corresponding to a function area by employing identification information in the communication device related to an embodiment of this document.
Figure 23B:
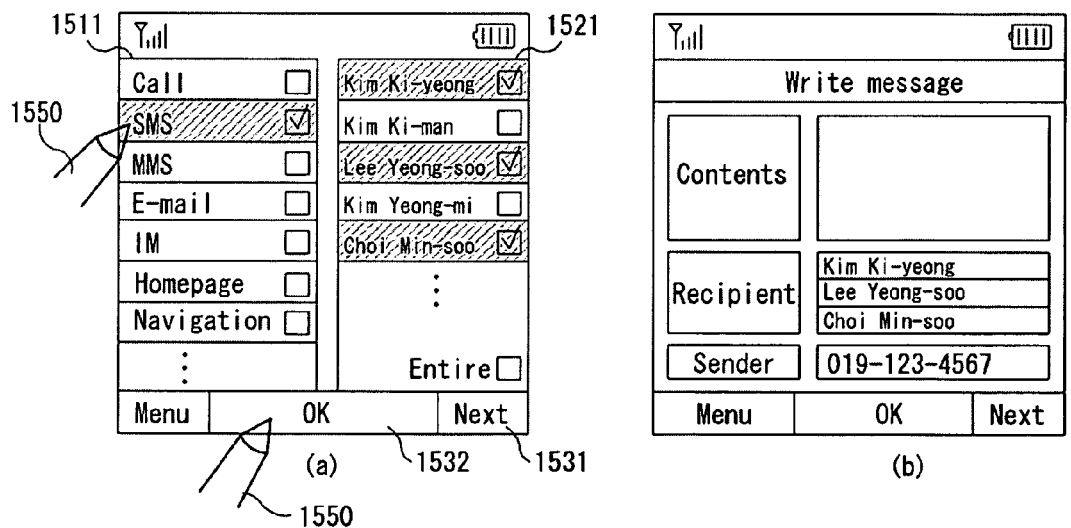

FIGS. 23A and 23B show screen configurations of a process of executing a function corresponding to a function area by employing identification information when identification information is first selected.

Referring to FIG. 23A, the communication device 100 determines whether selection of a function area has been completed. In particular, the communication device 100 can determine that selection of a function area has been completed when the input of a touch pattern designated in function area selection completion is sensed. For example, if a touch time, a touch number, a touch pressure, a touch area and the like satisfy the touch pattern designated in the function area selection completion, the communication device 100 can determine that selection of a function area has been completed.

Referring to FIG. 23B, the communication device 100 determines whether selection of a function area has been completed. In particular, the communication device 100 can determine that selection of a function area has been completed when a signal input (for example, activation of the area 'OK'), informing that selection has been completed after the function area is selected, is sensed. The communication device 100 may be equipped with an additional touch area for inputting selection completion of a function area.

Although not shown in the drawings, the communication device 100 may determine that selection of a function area has been completed when other function areas are not selected for a specific time since the function area is selected.

If it is determined that the selection of the function area has been completed in (a) of FIG. 23A or 22B, the communication device 100 sets a state where a message transmission function corresponding to the area 'SMS', that is, the selected function area can be performed (b). For example, the communication device 100 can enter a message write mode, receive the contents of a message, and designate the selected identification information as a message recipient. After the message write is completed, the communication device 100 can transmit the written message to a device corresponding to the selected identification information.

Figure 24A:
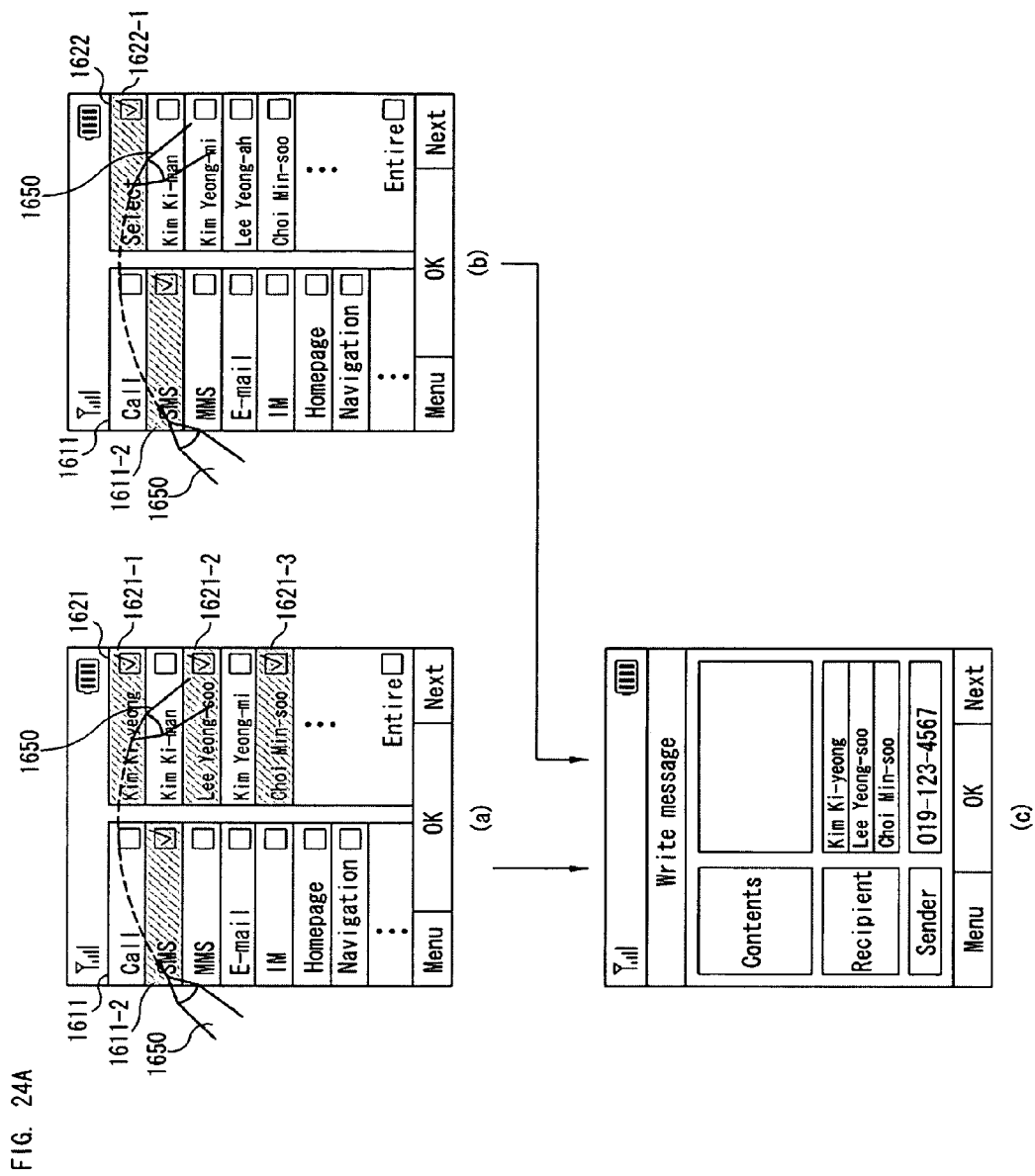
FIGS. 24A and 24B show third screen configurations of a process of executing a function corresponding to a function area by employing identification information in the communication device related to an embodiment of this document.
Figure 24B:
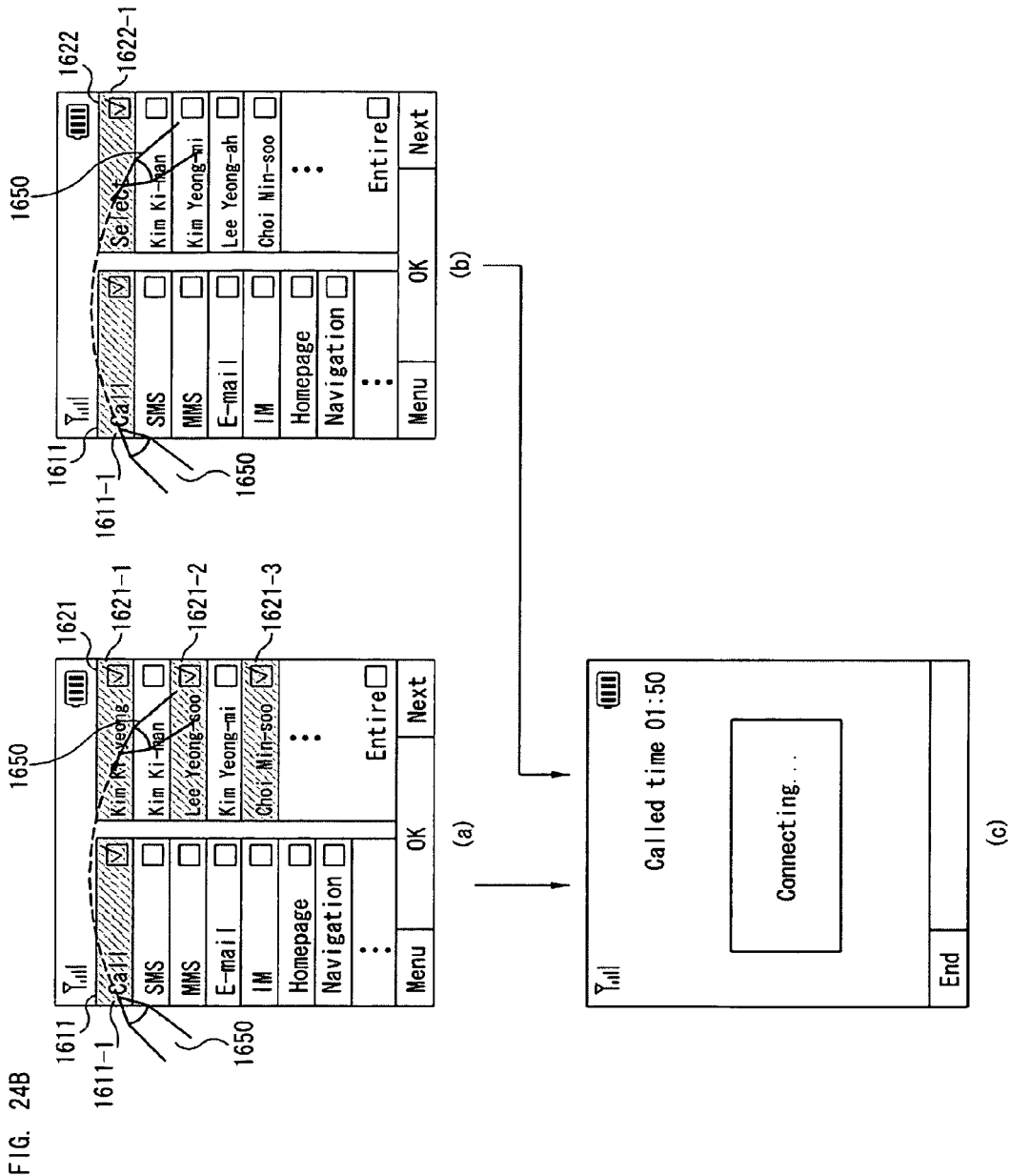

FIGS. 24A and 24B show screen configurations of a process of executing a function corresponding to a function area by employing identification information as identification information and a function area are respectively touched and dragged.

As shown in FIG. 24A, a user touches and drags one point of at least one selected identification information to a function area where a function to be executed is set by using a pointer 1650 (a, b).

In particular, in the case where plural pieces of identification information is touched and dragged, one point of at least one of plural pieces of identification information 1621-1 to 1621-3 can be touched and dragged to a specific function area 1611-2. Alternatively, when there exists one new identification information 1622-1 corresponding to plural pieces of selected identification information, one point of the new identification information can be touched and dragged to the specific function area 1611-2.

Hence, the communication device 100 can perform a function corresponding to a function area by employing at least one identification information touched and dragged to the function area (c).

For example, in order to perform a text message transmission function set in the area 'SMS', the communication device 100 can receive a text message, which designates a device corresponding to each of one or more identification information that have been touched and dragged, as a recipient, and transmit the text message.

Next, as shown in FIG. 24B, the user touches and drags one point of at least one selected function area to specific identification information by employing the pointer 1650 (a, b).

In particular, when specific identification information is plural, one point of the selected function area can be touched and dragged to any one of the plural pieces of identification information 1621-1 to 1621-3. Alternatively, when there exists one new identification information 1622-1 corresponding to the plural pieces of identification information, one point of the selected function area can be touched and dragged to the one new identification information.

Hence, the communication device 100 can perform a function corresponding to a function area by employing at least one identification information where one point of the function area is touched and dragged (c).

For example, in order to perform a call transmission function set in the area 'Call', the communication device 100 can connect a call to a device corresponding to each of one or more identification information. Here, when specific identification information is plural, a group call can be performed.

Referring back to FIG. 13, the communication device 100 can perform an output operation according to the completion of the execution step (S540).

Figure 25:
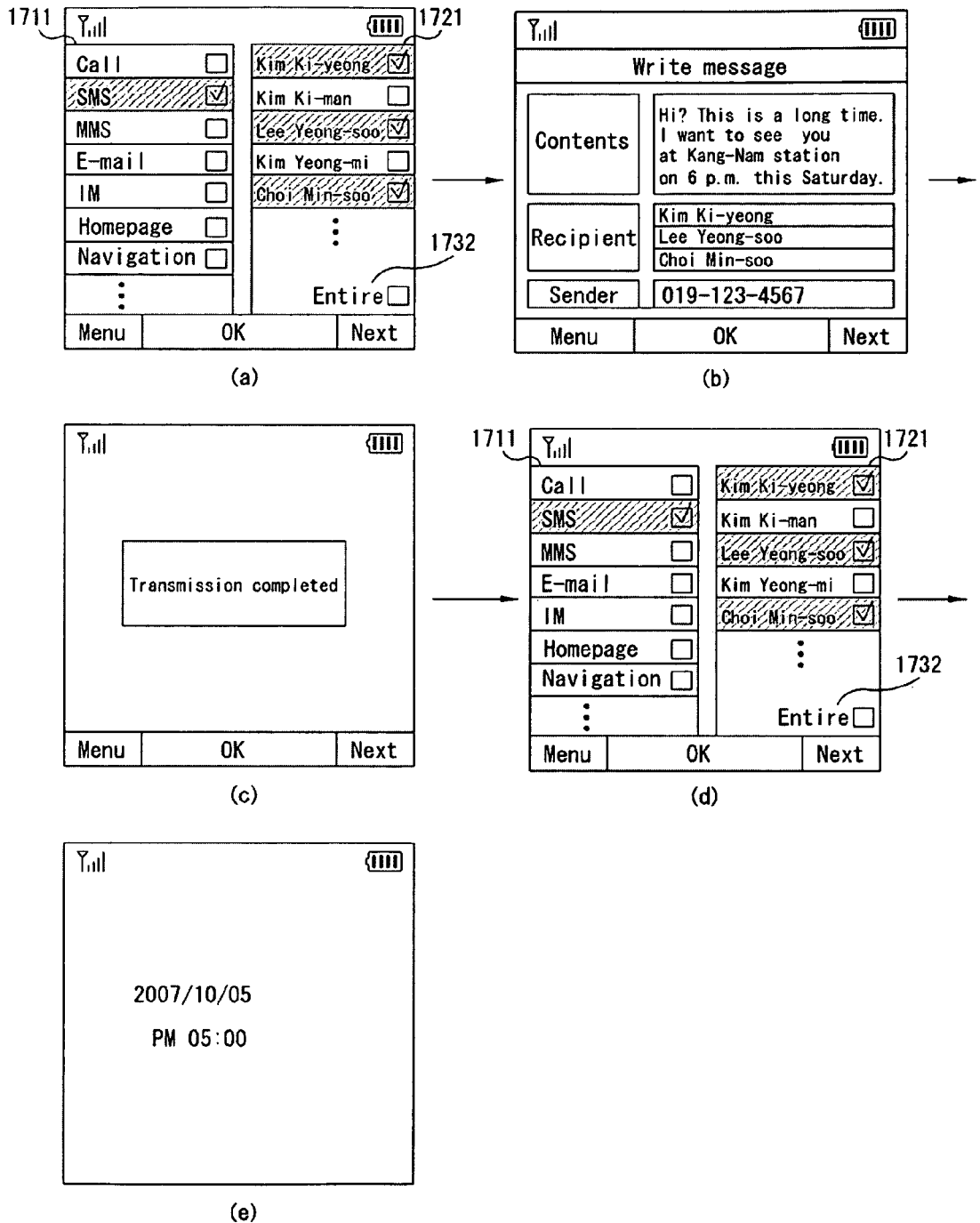
FIG. 25 shows a screen configuration of a process of informing the outside of the execution completion of a function when the execution of a function corresponding to a function area is completed in the communication device related to an embodiment of this document.

An output operation according to execution completion of a function is described below with reference to FIG. 25. FIG. 25 shows a screen configuration of a process of informing the outside of the execution completion of a function when the execution of a function corresponding to a function area is completed.

Referring to FIG. 25, if 'a message transmission function' employing selected identification information is completed (a, b, and c), the communication device 100 returns to a screen (a) showing a selection completion state of a function area and identification information and then faintly displays the selection completion screen in a fade-out manner (d). After the selection completion screen disappears, the communication device 100 displays a standby screen.

Here, the communication device 100 may employ vibration, a ring tone, a lamp or the like in order to inform that execution of a function has been completed.

The above communication device and the function execution method thereof may also be applied to devices that perform a messenger service function.

For example, the above identification information is information for identifying counterpart devices that are registered to perform a messenger service with a communication device, and may comprise a messenger ID, a messenger chat ID, a messenger use name, a telephone number of a counterpart device (or an e-mail address, a homepage address), and so on. Further, a function corresponding to the above function area may comprise a dialog (comprising voice, pictures, texts) function, an instant message function, a message (comprising text/multi-messages) transmission function, an e-mail transmission function, a homepage access function and the like.

Accordingly, when a messenger service is accessed using a communication device, the communication device can display plural pieces of identification information and a plurality of function areas on a screen and perform a function corresponding to a selected one of the plurality of displayed function areas by employing selected identification information of the plural pieces of displayed identification information.

Further, in accordance with an embodiment of this document, the function execution method of the communication device can be implemented as computer-readable codes in a medium in which a program is recorded. The computer-readable medium comprises all kinds of recording devices in which data readable by a computer system is stored. Examples of the computer-readable medium include ROM, RAM, CD-ROM, magnetic tapes, floppy disks, optical data storage devices and the like. The computer-readable medium further comprises one implemented in the form of carrier waves (for example, transmission via Internet). The computer may also comprise the controller 180 of the communication device.

The advantages of the communication device and the function execution method thereof in accordance with this document are as follows. First, a user can select identification information and function areas conveniently. Second, since identification information and function areas can be selected rapidly with no error, a function corresponding to a function area can be performed by employing selected identification information. Third, in the case where the communication device is equipped with a touch screen, a function corresponding to the function area can be executed rapidly by employing identification information that touched and dragged by touching and dragging identification information to the function area.

While this document has been described in connection with what is presently considered to be practical exemplary embodiments, it is to be understood that this document is not limited to the disclosed embodiments, but, on the contrary, is intended to cover various modifications and equivalent arrangements included within the spirit and scope of the appended claims.

What is claimed is:

1. A method of controlling a mobile communication device, the method comprising:
    displaying a plurality of execution keys on a touch screen of the mobile communication device in a standby mode;
    executing an operation assigned to a specific one of the plurality of execution keys by touching and dragging the specific execution key;
    displaying function icons on the touch screen, the function icons comprising at least a call icon, a message icon, a finder icon, or an Internet icon; and
    performing call connection to a short-cut telephone number assigned to a specific one of the plurality of execution keys when the call icon is touched and dragged to the specific execution key.

2. The method of claim 1, wherein the specific execution key does not move when touched and dragged to a different portion on the touch screen.

3. The method of claim 1, wherein the operation is executed in response to dragging of the specific execution key to a certain portion on the touch screen and the operation comprises:
    performing call connection to a short-cut telephone number assigned to the specific execution key;
    entering a message input mode for message transmission to the short-cut telephone number;
    entering a short-cut folder assigned to the specific execution key; or
    accessing an Internet address assigned to the specific execution key.

4. The method of claim 1, wherein when the specific execution key is dragged to a certain portion on the touch screen, the touch screen displays at the certain portion:
    a short-cut telephone number assigned to the specific execution key;
    a short-cut folder name assigned to the specific execution key; or
    an Internet address assigned to the specific execution key.

5. The method of claim 1, wherein the plurality of execution keys comprise numeric keys and function keys, and the method further comprises:
    displaying a number corresponding to a numeric key or a symbol corresponding to a function key if no short-cut information is assigned to the numeric key or the function key.

6. The method of claim 1, wherein the plurality of execution keys comprise a plurality of menus and a function corresponding to one of the plurality of menus is executed in response to touching and dragging of the one of the plurality of menus to a certain portion on the touch screen.

7. The method of claim 1, wherein the operation comprises:
    call connection to the short-cut telephone number assigned to the specific execution key when the specific execution key is touched and dragged to the call icon.

8. The method of claim 1, wherein the operation comprises:
    displaying a message input screen for message transmission to a short-cut telephone number assigned to the specific execution key when the specific execution key is touched and dragged to the message icon.

9. The method of claim 1, further comprising:
   displaying a screen for setting short-cut information if no short-cut information has been assigned to the specific execution key.

10. The method of claim 1, further comprising displaying a message input screen for message transmission to the short-cut telephone number assigned to the specific one of the plurality of execution keys when the message icon is touched and dragged to the specific execution key.

11. The method of claim 1, wherein when touching of the specific execution key is released within a specific time period after the specific execution key is touched, a number or a symbol corresponding to the specific execution key is input or a menu assigned to the specific execution key is executed.

12. The method of claim 11, wherein the menu comprises a default menu set by a manufacturer of the device or a user setting menu set by a user.

13. The method of claim 1, wherein when touching of the specific execution key is released after a specific time period after the specific execution key is touched, the operation comprises:
   performing call connection to a short-cut telephone number assigned to the specific execution key;
   displaying a message input screen for message transmission to the short-cut telephone number;
   entering a short-cut folder assigned to the specific execution key; or
   accessing an Internet address assigned to the specific execution key.

14. A mobile communication device, comprising:
   a wireless communication unit for performing a communication function;
   a touch screen for displaying a plurality of execution keys and function icons during a standby mode, the function icons comprising at least a call icon, a message icon, a finder icon, or an Internet icon; and
   a controller for performing an operation corresponding to a specific one of the plurality of execution keys that is touched and dragged on the touch screen,
   wherein the controller is configured to:
      perform call connection to a short-cut telephone number assigned to a specific one of the plurality of execution keys when the call icon is touched and dragged to the specific execution key; or
      display a message input screen for message transmission to the short-cut telephone number assigned to the specific one of the plurality of execution keys when the message icon is touched and dragged to the specific execution key.

15. The mobile communication device of claim 14, wherein the specific execution key does not move when touched and dragged to a different portion on the touch screen.

16. The mobile communication device of claim 14, wherein the operation is executed in response to dragging of the specific execution key to a certain portion on the touch screen and the operation comprises:
   performing call connection to a short-cut telephone number assigned to the specific execution key;
   entering a message input mode for message transmission to the short-cut telephone number;
   entering a short-cut folder assigned to the specific execution key; or
   accessing an Internet address assigned to the specific execution key.

17. The mobile communication device of claim 14, wherein when the specific execution key is dragged to a certain portion on the touch screen, the touch screen displays at the certain portion:
   a short-cut telephone number assigned to the specific execution key;
   a short-cut folder name assigned to the specific execution key; or
   an Internet address assigned to the specific execution key.

18. The mobile communication device of claim 14, wherein the plurality of execution keys comprise numeric keys and function keys, and the touch screen further displays a number corresponding to a numeric key or a symbol corresponding to a function key if no short-cut information is assigned to the numeric key or the function key.

19. The mobile communication device of claim 14, wherein the plurality of execution keys comprise a plurality of menus and a function corresponding to one of the plurality of menus is executed in response to touching and dragging of the one of the plurality of menus to a certain portion on the touch screen.

20. The mobile communication device of claim 14, wherein the touch screen further displays a screen for setting short-cut information if no short-cut information has been assigned to the specific execution key.

21. The mobile communication device of claim 14, wherein when touching of the specific execution key is released within a specific time period after the specific execution key is touched, a number or a symbol corresponding to the specific execution key is input or a menu assigned to the specific execution key is executed.

22. The mobile communication device of claim 21, wherein the menu comprises a default menu set by a manufacturer of the device or a user setting menu set by a user.

23. The mobile communication device of claim 14, wherein when touching of the specific execution key is released after a specific time period after the specific execution key is touched, the operation comprises:
   performing call connection to a short-cut telephone number assigned to the specific execution key;
   displaying a message input screen for message transmission to the short-cut telephone number;
   entering a short-cut folder assigned to the specific execution key; or
   accessing an Internet address assigned to the specific execution key.

24. A method of controlling a mobile communication device, the method comprising:
   displaying a plurality of execution keys on a touch screen of the mobile communication device;
   executing an operation assigned to a specific one of the plurality of execution keys by touching and dragging the specific execution key;
   displaying function icons on the touch screen, the function icons comprising at least a call icon, a message icon, a finder icon, or an Internet icon; and
   performing call connection to a telephone number assigned to the specific one of the plurality of execution keys when the specific execution key is touched and dragged to the call icon.

25. The method claim of claim 24, wherein the operation is to distinctively distinguish the specific execution key that was touched and dragged from other plurality of execution keys.

26. The method of claim 24, further comprising:
   displaying a message input screen for message transmission to the telephone number assigned to the specific one of the plurality of execution keys when the specific execution key is touched and dragged to the message icon.

27. A mobile communication device, comprising:
a wireless communication unit for performing a communication function;
a touch screen for displaying a plurality of execution keys and function icons, the function icons comprising at least a call icon, a message icon, a finder icon, or an Internet icon; and
a controller for performing an operation corresponding to a specific one of the plurality of execution keys that is touched and dragged on the touch screen,
wherein the controller is configured to:
  perform call connection to a telephone number assigned to a specific one of the plurality of execution keys when the specific execution key is touched and dragged to the call icon; or
  display a message input screen for message transmission to the telephone number assigned to the specific one of the plurality of execution keys when the specific execution key is touched and dragged to the message icon.

* * * * *